United States Patent
Shimamoto et al.

(10) Patent No.: US 12,138,796 B2
(45) Date of Patent: Nov. 12, 2024

(54) TORQUE CONTROL OF A MOTOR

(71) Applicant: KABUSHIKI KAISHA YASKAWA DENKI, Kitakyushu (JP)

(72) Inventors: Keita Shimamoto, Fukuoka (JP); Koji Uemura, Fukuoka (JP)

(*) Notice: Subject to any disclaimer, the term of this patent is extended or adjusted under 35 U.S.C. 154(b) by 331 days.

(21) Appl. No.: 17/574,577

(22) Filed: Jan. 13, 2022

(65) Prior Publication Data
US 2022/0134553 A1    May 5, 2022

Related U.S. Application Data

(63) Continuation of application No. PCT/JP2019/028261, filed on Jul. 18, 2019.

(51) Int. Cl.
| | |
|---|---|
| *B25J 9/16* | (2006.01) |
| *B25J 9/12* | (2006.01) |
| *B25J 13/08* | (2006.01) |

(52) U.S. Cl.
CPC ........... *B25J 9/1633* (2013.01); *B25J 9/12* (2013.01); *B25J 9/1653* (2013.01); *B25J 9/1664* (2013.01); *B25J 9/1674* (2013.01); *B25J 13/085* (2013.01)

(58) Field of Classification Search
CPC ........... G05B 2219/39322; G05B 2219/39323; G05B 2219/39324; G05B 2219/39329; G05B 2219/39331; G05B 2219/39333; G05B 2219/39264; G05B 2219/40202; B25J 9/1633; B25J 9/12; B25J 9/1653; B25J 9/1664; B25J 9/1674; B25J 13/085; B25J 9/1676

See application file for complete search history.

(56) References Cited

U.S. PATENT DOCUMENTS

| | | |
|---|---|---|
| 4,772,161 A | 9/1988 | Nagao et al. |
| 4,886,529 A | 12/1989 | Hashimoto et al. |
| 4,891,764 A | 1/1990 | McIntosh |
| 4,967,127 A | 10/1990 | Ishiguro et al. |
| 5,103,404 A | 4/1992 | McIntosh |
| 5,119,006 A * | 6/1992 | Torii .................. B25J 9/1676 318/587 |

(Continued)

FOREIGN PATENT DOCUMENTS

| | | |
|---|---|---|
| CN | 101134315 | 3/2008 |
| CN | 103107767 | 5/2013 |

(Continued)

OTHER PUBLICATIONS

Extended Search Report in corresponding European Application No. 20839682.0 dated Nov. 15, 2023.

(Continued)

*Primary Examiner* — Abby Y Lin
*Assistant Examiner* — Dylan M Katz
(74) *Attorney, Agent, or Firm* — SOEI PATENT & LAW FIRM

(57) ABSTRACT

A robot system includes: a robot comprising a joint driven by a motor; and a circuitry configured to: execute position control of the motor based on position commands; store torque commands generated based on the position commands during execution of the position control of the motor; and execute torque control of the motor based on the stored torque commands.

20 Claims, 24 Drawing Sheets

(56) References Cited

U.S. PATENT DOCUMENTS

| | | | | |
|---|---|---|---|---|
| 5,994,864 | A * | 11/1999 | Inoue | B25J 9/1633 |
| | | | | 318/591 |
| 7,341,432 | B2 | 3/2008 | Sung et al. | |
| 7,456,592 | B2 | 11/2008 | Yoo et al. | |
| 10,029,369 | B1 * | 7/2018 | Carlisle | B25J 9/042 |
| 2006/0071625 | A1 | 4/2006 | Nakata et al. | |
| 2011/0213527 | A1 | 9/2011 | Itabashi et al. | |
| 2012/0000891 | A1 | 1/2012 | Nakanishi et al. | |
| 2012/0158179 | A1 * | 6/2012 | Ooga | B25J 9/1697 |
| | | | | 901/47 |
| 2013/0073085 | A1 | 3/2013 | Oaki et al. | |
| 2013/0090761 | A1 | 4/2013 | Sejimo et al. | |
| 2014/0107843 | A1 * | 4/2014 | Okazaki | B66C 23/005 |
| | | | | 700/260 |
| 2014/0139170 | A1 | 5/2014 | Tian | |
| 2016/0141994 | A1 | 5/2016 | Takase | |
| 2016/0354933 | A1 | 12/2016 | Sato | |
| 2018/0107174 | A1 | 4/2018 | Takahashi | |
| 2018/0154526 | A1 | 6/2018 | Oguri et al. | |
| 2018/0207798 | A1 * | 7/2018 | Tsuzaki | B25J 13/085 |
| 2018/0243899 | A1 | 8/2018 | Hashimoto et al. | |
| 2018/0246491 | A1 | 8/2018 | Shinoda et al. | |
| 2018/0311836 | A1 | 11/2018 | Muneto | |
| 2019/0126479 | A1 * | 5/2019 | Motohashi | B25J 9/1694 |

FOREIGN PATENT DOCUMENTS

| | | |
|---|---|---|
| CN | 103786721 | 5/2014 |
| CN | 105409110 | 3/2016 |
| CN | 107016208 | 8/2017 |
| CN | 107204726 | 9/2017 |
| CN | 107921625 | 4/2018 |
| CN | 108136604 | 6/2018 |
| CN | 108508784 | 9/2018 |
| CN | 109719376 | 5/2019 |
| JP | S62-203756 | 9/1987 |
| JP | S63-047058 | 2/1988 |
| JP | H2-015956 | 1/1990 |
| JP | H4-135189 | 5/1992 |
| JP | 2001-038673 | 2/2001 |
| JP | 2009-297827 | 12/2009 |
| JP | 2011-125986 | 6/2011 |
| JP | 2012-011403 | 1/2012 |
| JP | 2013-066965 | 4/2013 |
| JP | 2013-225284 | 10/2013 |
| JP | 2014-155986 | 8/2014 |
| JP | 2016-028842 | 3/2016 |
| JP | 2017-001122 | 1/2017 |
| JP | 2018-065221 | 4/2018 |
| JP | 2018-089744 | 6/2018 |
| WO | 2015/025356 | 2/2015 |
| WO | 2017/073052 | 5/2017 |
| WO | 2019/065427 | 4/2019 |

OTHER PUBLICATIONS

International Preliminary Report on Patentability with Written Opinion dated Jan. 18, 2022 for PCT/JP2019/028261.

International Search Report dated Feb. 2, 2021 for PCT/JP2020/044359.

International Preliminary Report on Patentability with Written Opinion dated Jun. 9, 2022 for PCT/JP2020/044359.

International Search Report dated Sep. 17, 2019 for PCT/JP2019/028261.

International Search Report dated Jun. 16, 2020 for PCT/JP2020/014290.

International Preliminary Report on Patentability with Written Opinion dated Jan. 27, 2022 for PCT/JP2020/014290.

Soei Patent and Law Firm, Statement of Related Matters, dated Feb. 9, 2022.

Extended Search Report in corresponding European Application No. 19937854.8, dated Feb. 22, 2023.

Office Action issued in Chinese Patent Application No. 201980098482.X, dated Feb. 28, 2024 (with English partial translation).

Office Action issued in Chinese Patent Application No. 202080051279.X, dated Jul. 20, 2023 (with English partial translation).

* cited by examiner

TORQUE CONTROL OF A MOTOR

CROSS-REFERENCE TO RELATED APPLICATIONS

This application is a continuation application of PCT Application No. PCT/JP2019/028261, filed on Jul. 18, 2019, the entire contents of which are incorporated herein by reference.

BACKGROUND

Field

Japanese Unexamined Patent Publication No. 2001-38673 discloses an impedance control device of a horizontally articulated robot arm capable of achieving an appropriate avoidance operation regardless of where the arm contacts the environment by attaching a force sensor for measuring an external force and a torque sensor for measuring a torque acting on each joint axis to the horizontally articulated robot arm for executing various handling operations and by executing force control of each joint based on the sensor information.

SUMMARY

Disclosed herein is an example robot system. The robot system includes: a robot comprising a joint driven by a motor; and a circuitry configured to: execute position control of the motor based on position commands; store torque commands generated based on the position commands during execution of the position control of the motor; and execute torque control of the motor based on the stored torque commands.

DETAILED DESCRIPTION

Figure 1:
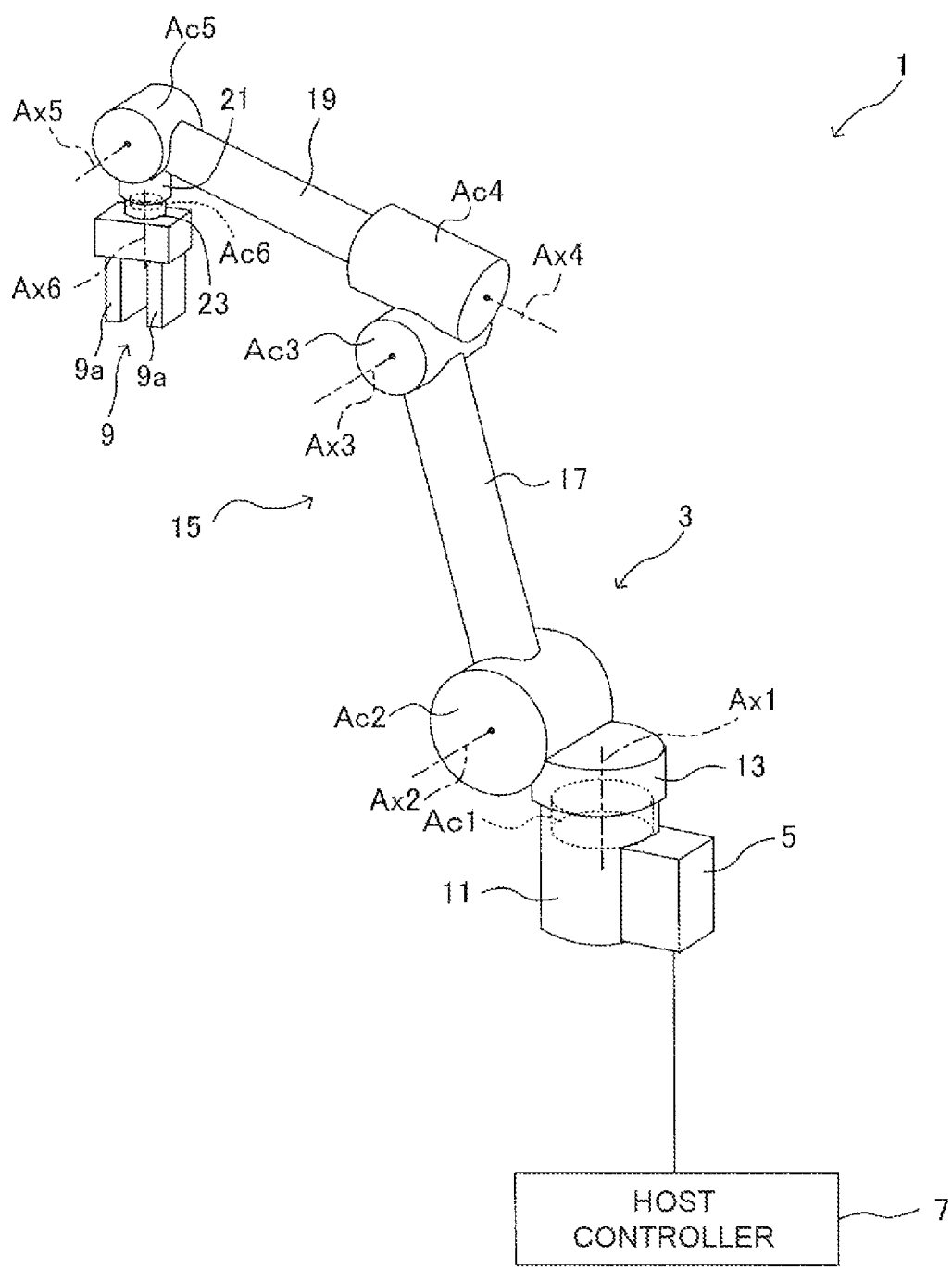
FIG. 1 is a perspective view illustrating an example configuration of a robot system.

In the following description, with reference to the drawings, the same reference numbers are assigned to the same components or to similar components having the same function, and overlapping description is omitted.

In general, a robot controls a position of each joint and moves a hand to a taught position. When a robot collaborates with a human, it is desired to safely operate the robot so that a large force is not applied to the human even if the robot comes into contact with the human during operation by position control. Therefore, for example, the operating speed is set to a relatively low value, or a torque sensor is used to detect contact with human and stop the motor.

However, when the robot operates according to the position control, the robot operates to reach the taught position even if an external force is applied to the robot due to contact with the human. As a result, the output of torque increases, which may harm the human. In addition, since each joint of the robot generally has low back drivability, it may be difficult to detect contact from current information of a motor even if an external force is applied to the robot due to contact with a human. Therefore, a robot collaborating with a human is provided with a force sensor for measuring an external force and a torque sensor for measuring a torque acting on each joint axis in order to detect contact with the human. However, such an external force measurement sensor is expensive, which causes an increase in the cost of the human collaborative robot. Therefore, there has been a demand for a robot that operates safely without using an external force measurement sensor so as not to apply a large force even in contact with a human.

Therefore, the inventors of the present application have conceived the following points through studies. That is, motor control can be classified into position control and torque control. Note that force control is included in the torque control because the force control is different from the torque control in unit but has the same property. Current control is included in the torque control because a current command is obtained by multiplying the torque command by a constant, and the current control has the same property as the torque control. In the position control, control is executed so that a commanded position is reached with an arbitrary torque. On the other hand, in the torque control, a commanded torque is generated at an arbitrary position. Therefore, by controlling the torque of the motor so as to output a torque that does not harm the human, the robot can be safely operated so as not to harm the human even when the robot is in contact with the human. That is, the inventors have conceived that a robot capable of collaborating with human without using an external force measurement sensor can be obtained by providing a robot that draws a desired path (taught path) by torque control.

1. Example Robot System

An example robot system will be described with reference to the drawings.

1-1. Example Configuration of Robot System

An example of the configuration of a robot system 1 will be described with reference to FIG. 1.

As illustrated in FIG. 1, the robot system 1 includes a robot 3 that execute a predetermined task on a workpiece W (see FIG. 16 to FIG. 18 described later), a robot controller 5, and a host controller 7.

The robot 3 is, for example, a vertical articulated type six-axis robot with six joint portions driven by a motor. A hand 9 is attached to the tip of the robot 3 as an end effector. The robot controller 5 is attached to, for example, a base 11 of the robot 3, and controls each motor to control the operation of the robot 3. The robot 3 may be a robot other than the six-axis robot (for example, a five-axis robot or a seven-axis robot). The robot 3 may be a robot other than the vertical articulated type, such as a horizontal articulated type or a parallel link robot. The robot controller 5 may be disposed separately from the robot 3.

The robot 3 executes, for example, a transfer operation of a workpiece for gripping and transferring the workpiece W by the hand 9 as the predetermined task. It should be noted that the task executed by the robot 3 is not limited to the transfer operation of the workpiece, and for example, the robot 3 may execute assembly of parts or products using the workpiece. Further, by changing the type of the end effector instead of the hand 9, the robot 3 may execute tasks such as painting, welding, bolting, and machining (cutting, polishing, etc.).

The robot controller 5 (an example of a controller) calculates a target rotation angle or the like of a servo motor (not shown) of each of actuators Ac1 to Ac6 of the robot 3 based on a position command (teaching data) input from the host controller 7. The target rotation angle or the like of the servo motors (not shown) of the actuators Ac1 to Ac6 are calculated to move the hand 9 of the robot 3 to the position taught by the teaching. The robot controller 5 controls the drive power to be provided to each servo motor of the actuators Ac1 to Ac6 based on the target rotation angle or the like, and controls the operation of the robot 3. The robot controller 5 and the host controller 7 include, for example, a motion controller, a personal computer (PC), and a programmable logic controller (PLC). It should be noted that the robot controller 5 and the host controller 7 may be configured not separately but integrally. At least one of the robot controller 5 and the host controller 7 may be constituted by a plurality of control devices. The position command may not be input from the host controller 7, and may be stored in the robot controller 5.

1-2. Example Robot Configuration

Next, with reference to FIG. 1, an example of the configuration of the robot 3 will be described.

As illustrated in FIG. 1, the robot 3 includes the base 11, a turning portion 13, and an arm 15. The base 11 is fixed to, for example, a floor, a wall, or a ceiling.

The turning portion 13 is supported at the upper end of the base 11 so as to be turnable around a rotation axis Ax1 substantially parallel to the vertical direction. The turning portion 13 is turnably driven around the rotation axis Ax1 with respect to the upper end of the base 11 by an actuator Ac1. The actuator Ac1 is provided in a joint portion between the turning portion 3 and the base 11.

The arm 15 is supported on one side portion of the turning portion 13. The arm 15 includes a lower arm portion 17, an upper arm portion 19, a wrist portion 21, and a flange portion 23.

The lower arm portion 17 is supported on one side portion of the turning portion 13 so as to be turnable around a rotation axis Ax2 substantially perpendicular to the rotation axis Ax1. The lower arm portion 17 is turnably driven around the rotation axis Ax2 with respect to one side portion of the turning portion 13 by an actuator Ac2. The actuator Ac2 is provided in a joint portion between the lower arm portion 17 and the turning portion 13.

The upper arm portion 19 is supported on the distal side of the lower arm portion 17 so as to be pivotable about a rotation axis Ax3 substantially parallel to the rotation axis Ax2 and rotatable about a rotation axis Ax4 substantially perpendicular to the rotation axis Ax3. The upper arm portion 19 is turnably driven around the rotation axis Ax3 with respect to the distal side of the lower arm portion 17 by an actuator Ac3. The upper arm portion 19 is also rotatably driven by an actuator Ac4 about the rotation axis Ax4 with respect to the distal side of the lower arm portion 17. The actuator Ac3 is provided in a joint portion between the upper arm portion 19 and the lower arm portion 17. The actuator Ac4 is provided in a joint portion between the upper arm portion 19 and the actuator Ac3.

The wrist portion 21 is supported on the distal side of the upper arm portion 19 so as to be turnable around a rotation axis Ax5 substantially perpendicular to the rotation axis Ax4. The wrist portion 21 is turnably driven around the rotation axis Ax5 with respect to the distal side of the upper arm portion 19 by an actuator Ac5. The actuator Ac5 is provided in a joint portion between the wrist portion 21 and the upper arm portion 19.

The flange portion 23 is supported on the distal side of the wrist portion 21 so as to be rotatable about a rotation axis Ax6 substantially perpendicular to the rotation axis Ax5. The flange portion 23 is rotatably driven around the rotation axis Ax6 by an actuator Ac6 with respect to the distal side of a wrist portion 32. The actuator Ac6 is provided in a joint portion between the flange portion 23 and the wrist portion 21.

The hand 9 is attached to the tip of the flange portion 23. The hand 9 rotates around the rotation axis Ax6 in conjunction with the rotation of the flange portion 23 around the rotation axis Ax6. The hand 9 includes a pair of claw members 9a and 9a that are operable in directions away from each other, and is capable of executing various operations and tasks, such as gripping the workpiece W.

The robot 3 having the above configuration is a six-axis robot having six joint portions including six actuators Ac1 to Ac6. The actuators Ac1 to Ac6 for driving the respective joint portions include, for example, a servo motor, a speed reducer, a brake, and the like. The servo motor, the speed reducer, the brake, and the like may not be disposed on the rotation axes Ax1 to Ax6, and may be disposed at positions away from the rotation axes Ax1 to Ax6.

In the above description, the rotation around the rotation axis along the longitudinal direction (or extending direction) of the arm 15 is referred to as "rotating", and the rotation around the rotation axis substantially perpendicular to the longitudinal direction (or extending direction) of the arm 15 is referred to as "turning" for distinction.

1-3. Example Configuration of Robot Controller

Next, with reference to FIG. 2 and FIG. 3, an example of the functional configuration of the robot controller 5 will be described separately at the time of torque teaching and at the time of torque playback. "Torque teaching" may refer to storing torque commands to each motor when the robot 3 is operated by executing position control on the motor of each joint of the robot 3. In addition, "torque playback" may refer to executing torque control on a motor of each joint of the robot 3 using torque commands stored in torque teaching to operate the robot 3. The robot controller 5 has the functions illustrated in FIG. 2 and FIG. 3 for the respective motors of the above-described six actuators Ac1 to Ac6, but FIG. 2 and FIG. 3 are shown as functions for a single motor M for the sake of simplicity.

Figure 2:
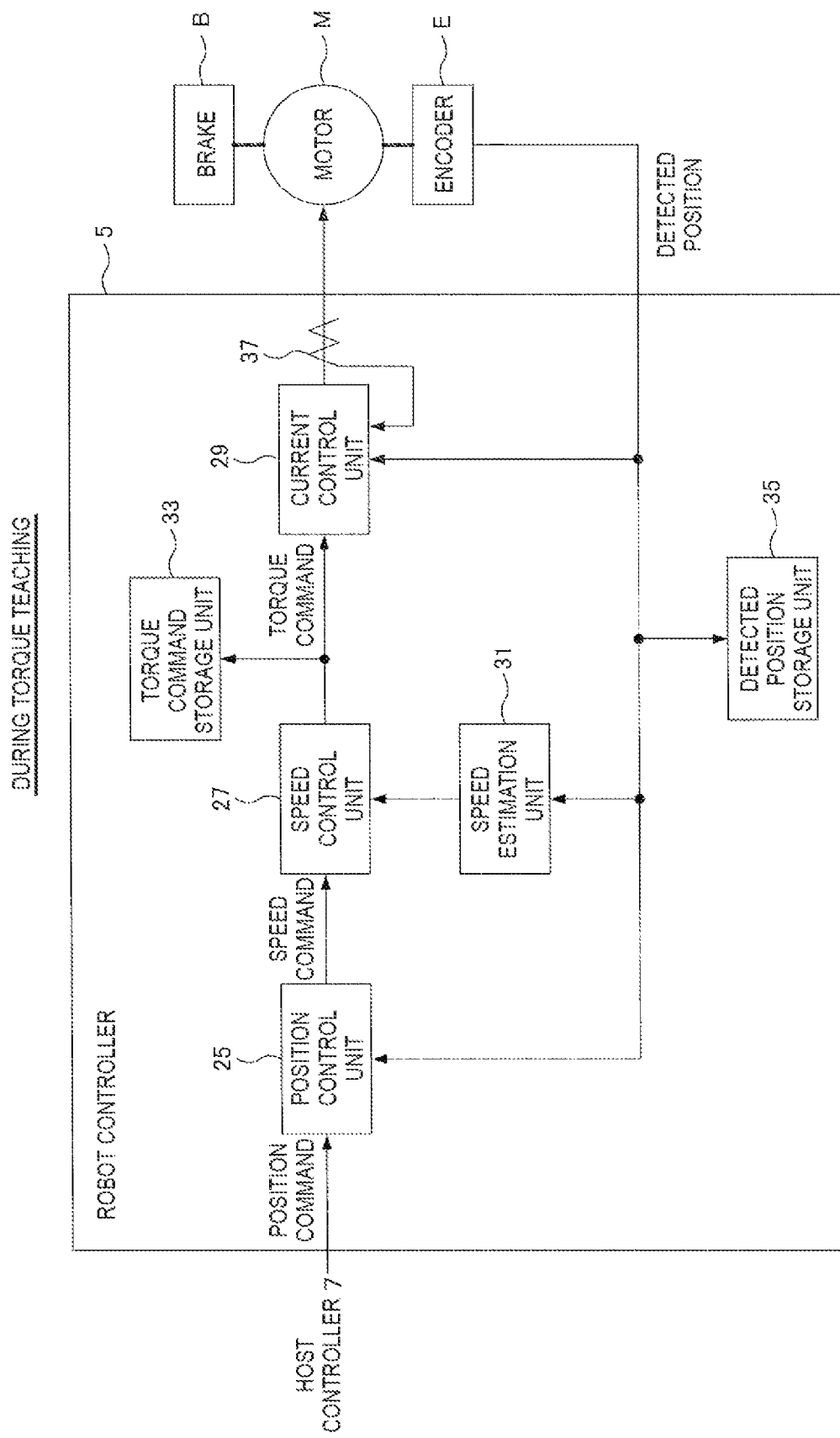
FIG. 2 is a block diagram illustrating an example functional configuration of a robot controller during torque teaching.
Figure 3:
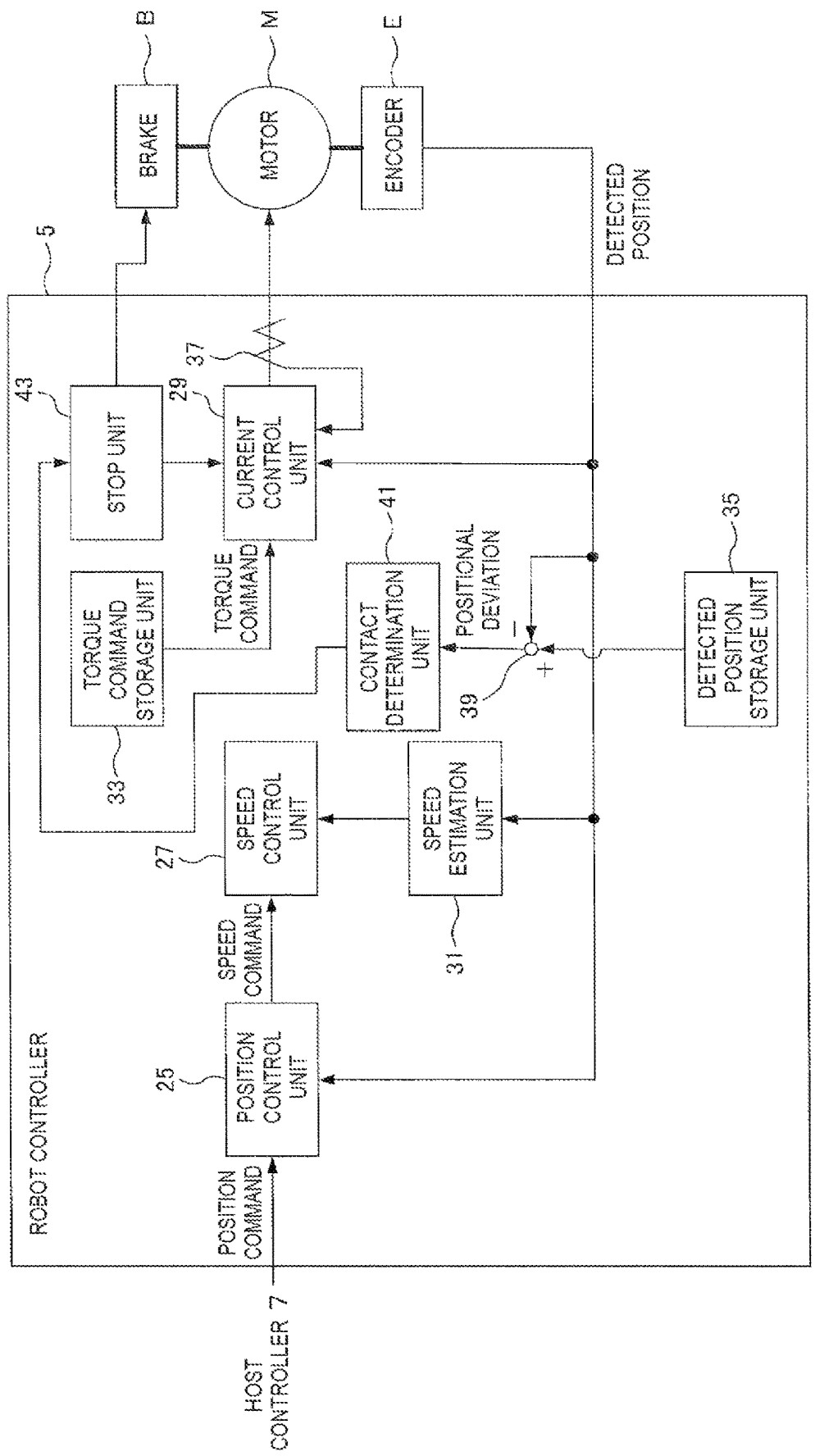
FIG. 3 is a block diagram illustrating an example functional configuration of the robot controller during torque playback.

FIG. 2 illustrates an example functional configuration of the robot controller 5 during the torque teaching. As illustrated in FIG. 2, the robot controller 5 includes a position control unit 25, a speed control unit 27, a current control unit 29, a speed estimation unit 31, a torque command storage unit 33, a detected position storage unit 35, and a current sensor 37. Each motor M of the actuators Ac1 to Ac6 includes an encoder E for detecting a rotational position (also referred to as a rotational angle) of the motor and a brake B capable of braking the motor.

Based on the position command output from the host controller 7 and the detected position detected by the encoder, the position control unit 25 is configured to generate a speed command for generating a speed at which the motor M reaches the command position by, for example, P control, PI control, or PID control. Based on the speed command generated by the position control unit 25 and the estimated speed calculated by the speed estimation unit 31, the speed control unit 27 is configured to generate a torque command for generating a torque such that the motor M reaches the command speed by, for example, P control, PI control, or PID control. The current control unit 29 is configured to calculate the current command based on the torque command generated by the speed control unit 27, determines the current value for the motor M to generate the command torque based on the current command, the detected position detected by the encoder, and the current value detected by the current sensor 37, for example, by P control, PI control, or PID control, and provides the current value to the motor M. The speed estimation unit 31 is configured to estimate the velocity by, for example, executing first order differentiation of the detected position detected by the encoder E with respect to time, or counting a detected signal (for example, a pulse signal) of the encoder E for a predetermined time. The position control unit 25, the speed control unit 27, and the current control unit 29 correspond to an example of a first control unit.

The torque command storage unit 33 is configured to store the value of the torque command generated by the speed control unit 27 (an example of a torque command generated based on a position command) in time series when the position control of the motor M is executed by the position control unit 25, the speed control unit 27, and the current control unit 29. As described above, the current command is obtained by multiplying the torque command by a constant and has the same properties. Therefore, "store torque command" may include "store current command". The detected position storage unit 35 is configured to store the detected position (an example of the first detected position) detected by the encoder E in time series when the position control of the motor M is executed by the position control unit 25, the speed control unit 27, and the current control unit 29. That is, when teaching the position of a desired hand to the robot 3 and playing back the hand in order to confirm a path according to the teaching, the motor M of each joint is position-controlled by the position control unit 25, the speed control unit 27, and the current control unit 29. At this time, the values of the torque commands generated by the speed control unit 27 for the operation of each joint are stored in time series for each motor M by the torque command storage unit 33. Similarly, at the time of playback by the position control, the detected position detected by the encoder E of each motor M is stored in time series for each motor M by the detected position storage unit 35. The playback based on the position control is referred to as "position playback" in order to distinguish it from the torque playback described above.

FIG. 3 illustrates an example of the functional configuration of the robot controller 5 during the torque playback. The torque command stored in the torque command storage unit 33 in the torque teaching is a torque command for moving the hand of the robot 3 to a desired position. Therefore, as illustrated in FIG. 3, when torque control using the torque command stored in the torque command storage unit 33 as a command value is executed for each motor M of the actuators Ac1 to Ac6 by the current control unit 29, the hand of the robot 3 is moved to a desired position if a disturbance different from that at the time of torque teaching does not act on the robot 3. As a result, a robot that draws a desired path (taught path) by torque control can be achieved. The term "disturbance" may include an external force acting on the robot 3, a modeling error (an error between a control model and an actual object), an internal interference force of the robot 3, and the like.

On the other hand, there is also a possibility that an unexpected disturbance is applied to the robot 3 due to contact with human or the like during the torque playback. In order to determine whether or not this disturbance is applied, as illustrated in FIG. 3, the robot controller 5 has a subtractor 39, a contact determination unit 41, and a stop unit 43 in addition to the configuration illustrated in FIG. 2. The detected position stored in the detected position storage unit 35 and the detected position (an example of the second detected position) detected by the encoder E when the torque control of the motor M by the current control unit 29 based on the torque command stored in the torque command storage unit 33 is executed are input to the subtractor 39. The subtractor 39 outputs the positional deviation of the input detected positions. The contact determination unit 41 determines whether there is contact with the robot 3 during the torque control. The contact determination unit 41 may compare the positional deviation output by the subtractor 39 with a first threshold (stopping threshold), and if the positional deviation is greater than the first threshold, determines that a disturbance greater than expected is applied (the possibility of contact is high), and if the positional deviation is equal to or smaller than the first threshold, determines that the disturbance is within expected (the possibility of contact is small).

When the contact determination unit 41 determines that there is contact, the stop unit 43 (an example of a first stop unit) stops supplying current to the motor M and activates the brake B to stop the motor M. The stop unit 43 may output an alarm instead of or in addition to stopping the motor M.

Figure 24:
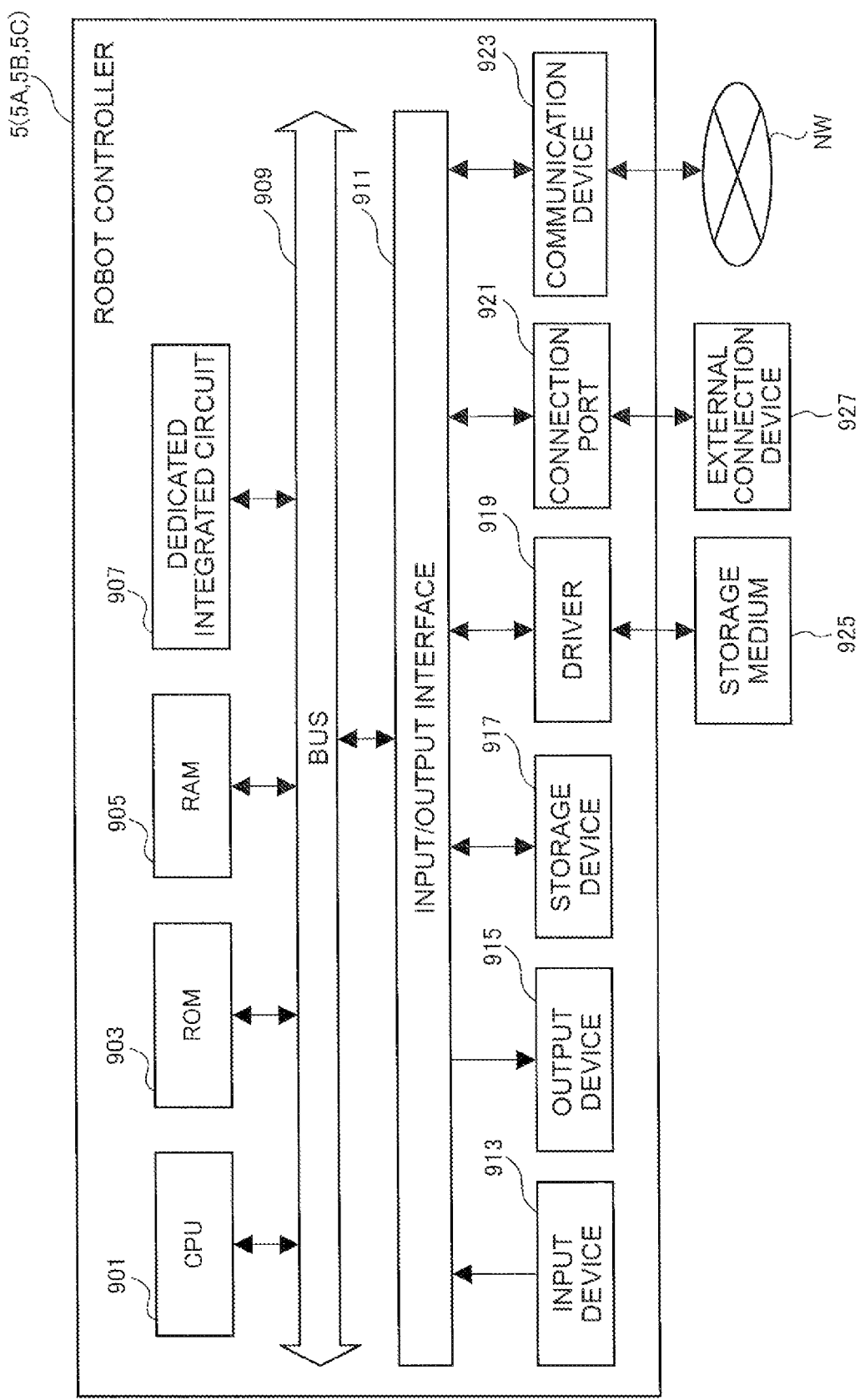
FIG. 24 is a block diagram illustrating an example hardware configuration of the robot controller.

The processes in the torque command storage unit 33, the detected position storage unit 35, the contact determination unit 41, and the like described above are not limited to the example of sharing of these processes. For example, the processes may be executed by a smaller number of processing units (for example, one processing unit) or may be executed by more subdivided processing units. In addition, in each processing unit of the robot controller 5, a portion (a servo amplifier or the like) that supplies driving power to the motor M may be implemented by an actual device, and other functions may be implemented by a program executed by a CPU 901 (see FIG. 24) described later, or a part or all thereof may be implemented by an actual device such as an application specific integrated circuit (ASIC), a field programmable gate array (FPGA), or another electric circuit. Further, the sharing of the processing between the robot controller 5 and the host controller 7 is not limited to the above example, and for example, the processing by the torque command storage unit 33, the detected position storage unit 35, the contact determination unit 41, and the like may be executed by the host controller 7, or the processing may be shared by the robot controller 5 and the host controller 7.

1-4. Example Control by Robot Controller

Figure 4:
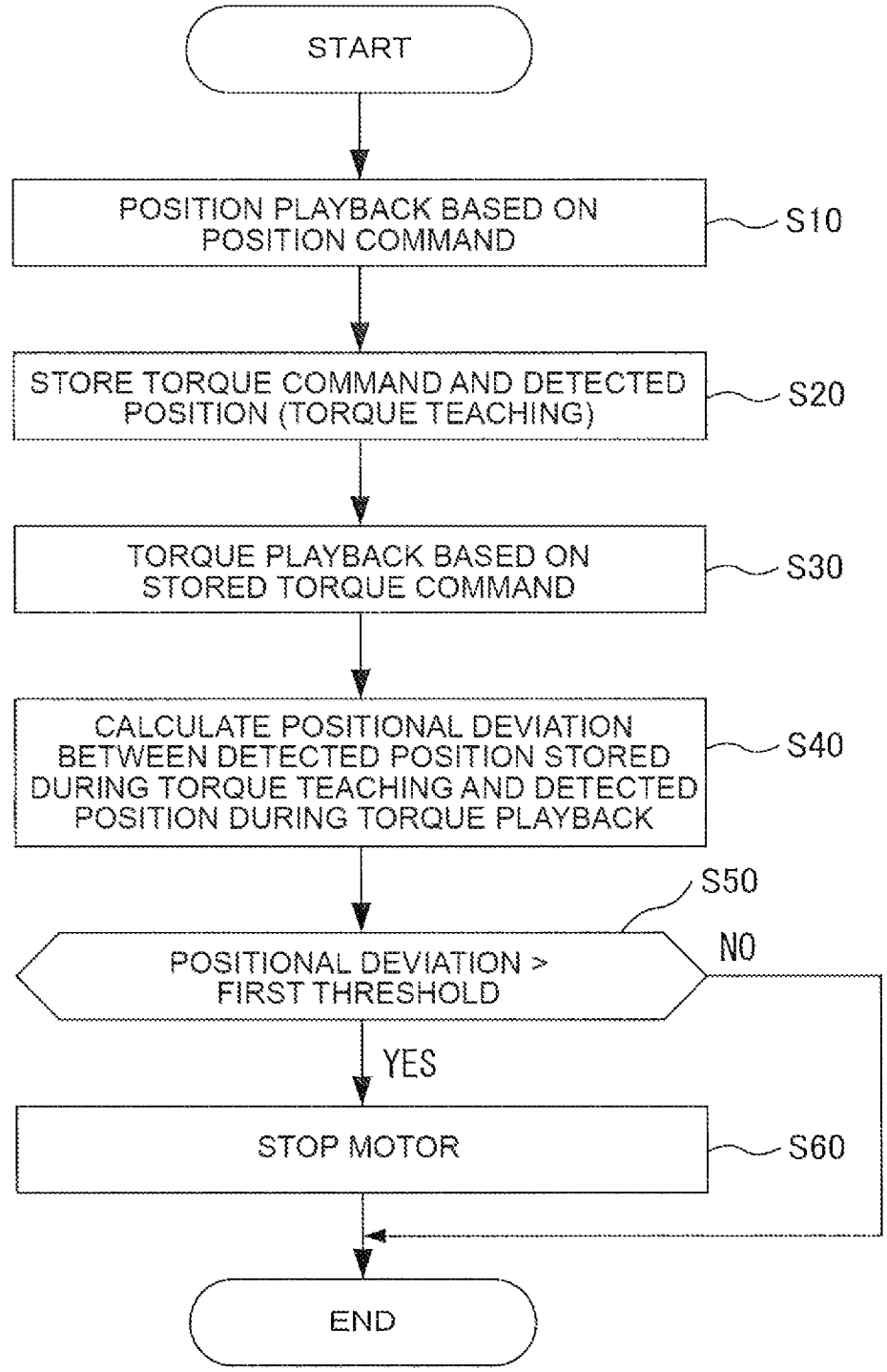
FIG. 4 is a flowchart illustrating an example control by the robot controller.

Next, an example control by the robot controller 5 will be described with reference to FIG. 4. It is assumed that, before executing this flowchart, teaching to the robot 3 is executed in advance using a teaching pendant or the like, and a position command corresponding to the teaching is stored in the host controller 7. The teaching executed at this time is referred to as "position teaching" to be distinguished from the above-described torque teaching.

In an operation S10, the robot controller 5 executes position control for each motor M based on the position command from the host controller 7, and executes position playback for operating the robot 3.

In a operation S20, the robot controller 5 stores the torque command generated by the speed control unit 27 during the position playback in time series by the torque command storage unit 33 (torque teaching). Further, the robot controller 5 stores the detected position detected by the encoder E during the position playback by the detected position storage unit 35 in time series.

In a operation S30, the robot controller 5 executes torque control using the torque command stored in the operation S20 as a command value for each motor M by the current control unit 29, and executes torque playback for operating the robot 3.

In a operation S40, the robot controller 5 calculates, by the subtractor 39, the positional deviation between the detected position at the time of torque teaching stored in the operation S20 and the detected position detected by the encoder E in the executing torque playback.

In a operation S50, the robot controller 5 determines whether the positional deviation calculated in the operation S40 is greater than the first threshold by the contact determination unit 41. If the positional deviation is equal to or smaller than the first threshold (the operation S50: NO), this flow is terminated. On the other hand, if the positional deviation is greater than the first threshold (the operation S50: YES), the process moves to a operation S60.

In the operation S60, the robot controller 5 causes the stop unit 43 to stop supplying current to the motor M and activate the brake B to stop the motor M. Thereafter, this flow is terminated.

1-5. Example Simulation Results

Next, an example simulation result for verifying the effect will be described with reference to FIG. 5 to FIG. 12. Here, the simulation was executed as a one-axis operate using a rotary motor and a ball screw.

Figure 5:
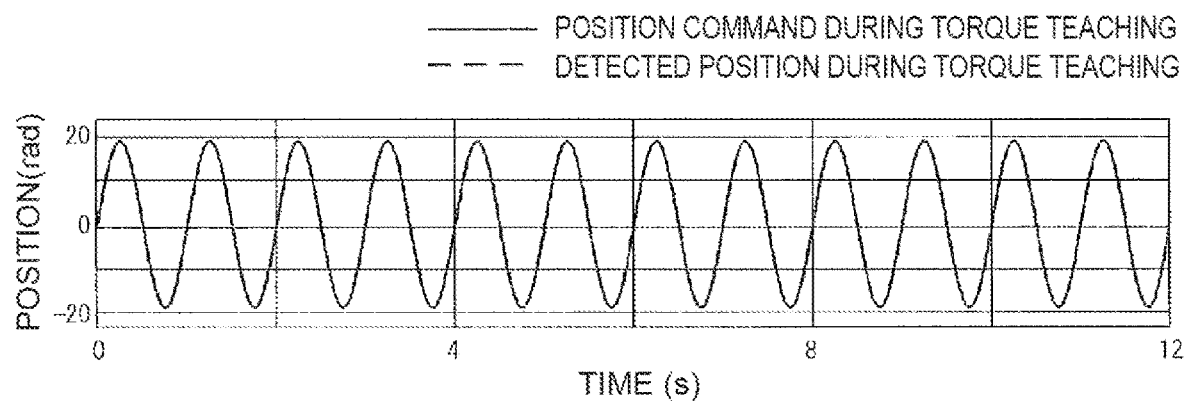
FIG. 5 is a graph showing an example simulation result for verifying an effect.
Figure 6:
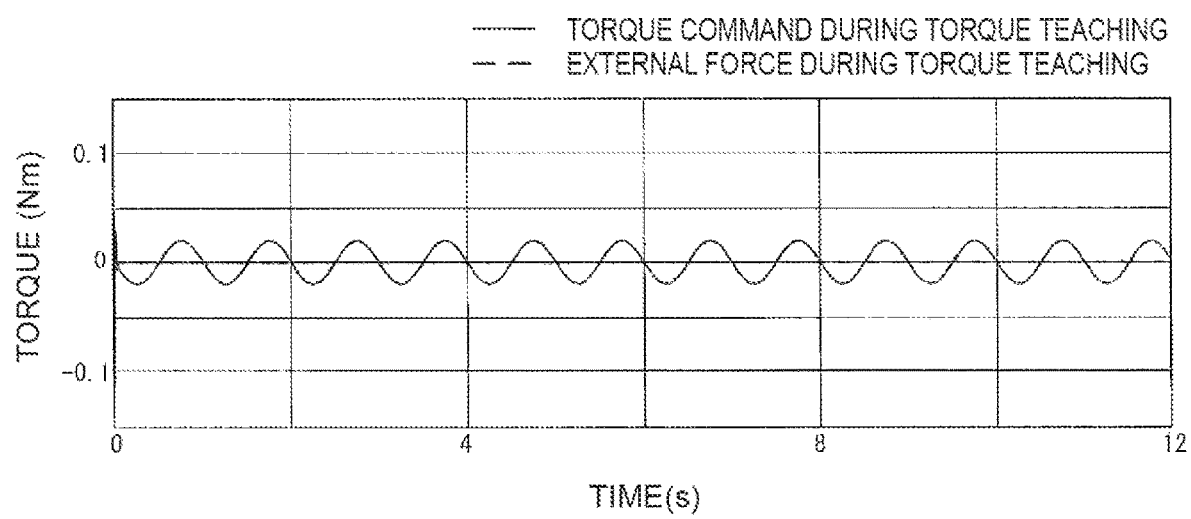
FIG. 6 is a graph showing another example simulation result for verifying the effect.

FIG. 5 and FIG. 6 show an example of operation and processing at the time of torque teaching. As shown in FIG. 5, the position command used for the position control at the time of torque teaching is, for example, a sinusoidal wave having a magnitude of 18.84 rad and a frequency of 1 Hz. As shown in FIG. 6, it is assumed that no external force was applied. In this case, as shown in FIG. 5, the position detected by the encoder substantially coincides with the position command. Further, a torque command as shown in FIG. 6 is generated based on the position command, and the torque command values are stored in time series.

Next, the effect obtained by the torque playback is verified by comparing the operations of the position playback (a comparative example) and the torque playback. Here, in both of the position playback and the torque playback, the external force is not applied from 0s to 4s so that the motor is in the same state as that at the time of the torque teaching. In addition, after 4s, unlike during the torque teaching, the external force is applied in a range greater than 0 rad. For example, a reaction force received in contact with an object having a rigidity of 0.0372 Nm/rad and a viscosity of 14.2 Nm/(rad/s) was defined as the external force.

Figure 7:
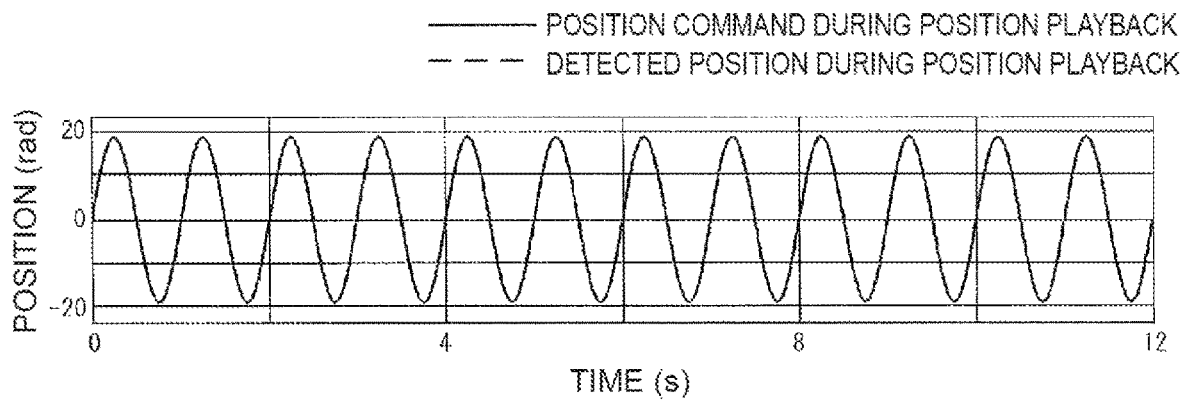
FIG. 7 is a graph showing still another example simulation result for verifying the effect.
Figure 8:
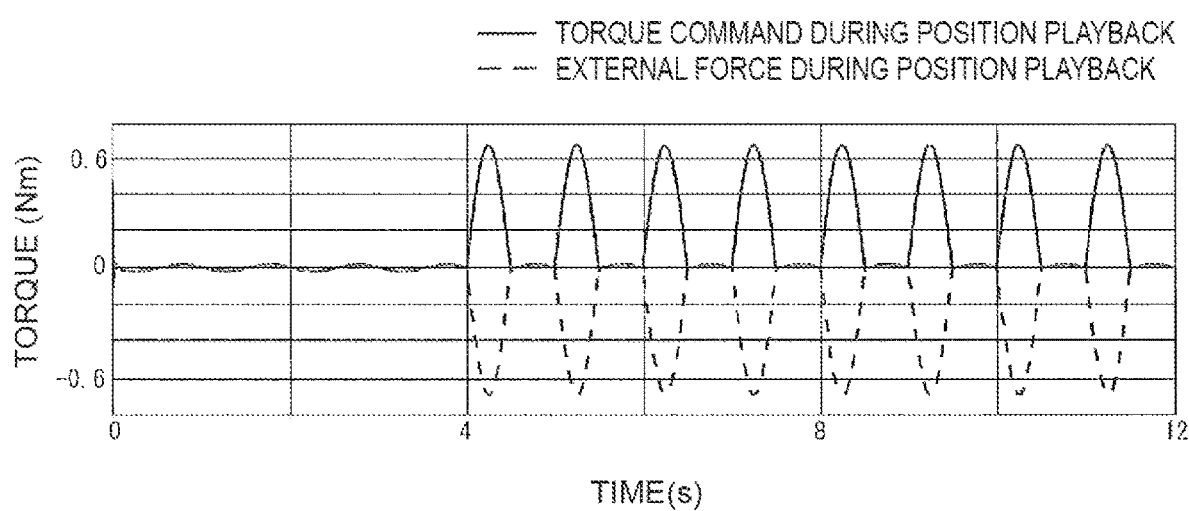
FIG. 8 is a graph showing still another example simulation result for verifying the effect.
Figure 9:
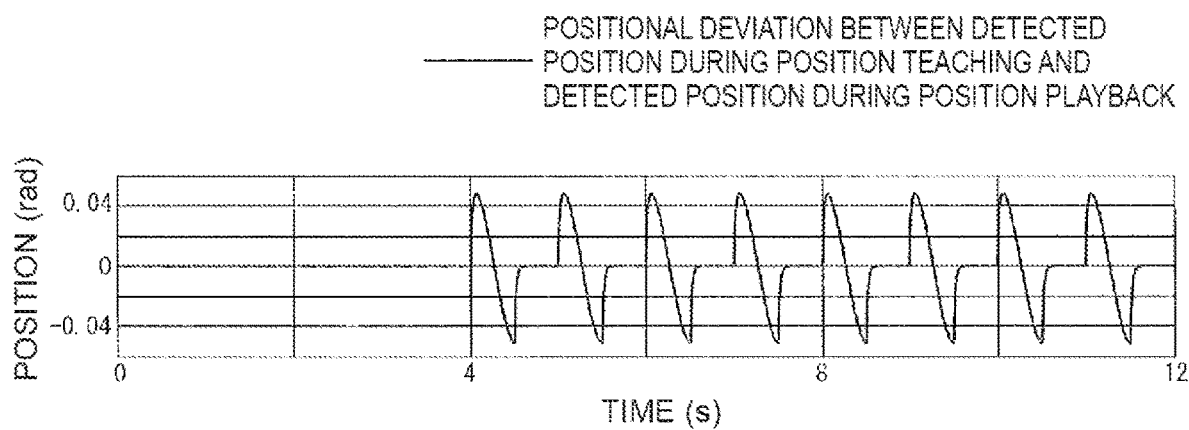
FIG. 9 is a graph showing still another example simulation result for verifying the effect.

FIG. 7 and FIG. 8 show examples of the position and torque at the time of position playback in this case. FIG. 9 shows an example of positional deviation between the detected position at the time of position teaching and the detected position at the time of position playback. As shown in FIG. 7, at the time of position playback for executing position control, even if an external force different from that at the time of position teaching is received, the detected position follows the position command and substantially coincides with the position command. Further, as shown in FIG. 9, the positional deviation between the detected position at the time of position teaching and the detected position at the time of position playback is, for example, 0.05 rad at the maximum, and the positional deviation is $1/100$ or less of the command value as compared with the magnitude 18.84 rad of the position command. Further, as shown in FIG. 8, in order to cause the detected position to follow the position command even when the external force is received, a greater torque than that at the time of position teaching is output after 4s. The maximum value of the magnitude of the external force indicating the torque applied to the contact target is 0.7 Nm in this example.

As indicated by FIG. 7 to FIG. 9 described above, in the position playback (the comparative example), when the external force is received, the motor operates so as to follow the taught position by outputting the torque overcoming the external force. Therefore, even when the human comes into contact, a large torque is output so as to follow the position command in the same manner as described above, and a force is applied to the human, which may harm the human.

Figure 10:
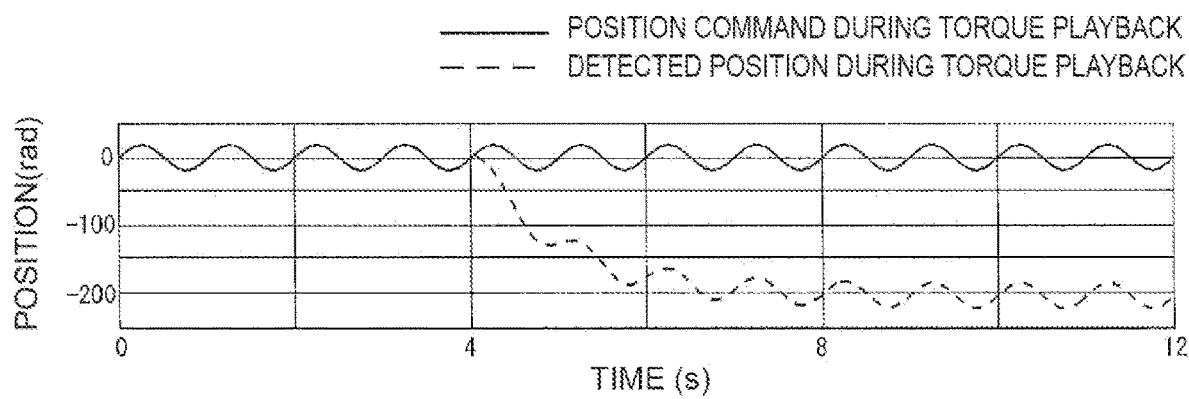
FIG. 10 is a graph showing still another example simulation result for verifying the effect.
Figure 11:
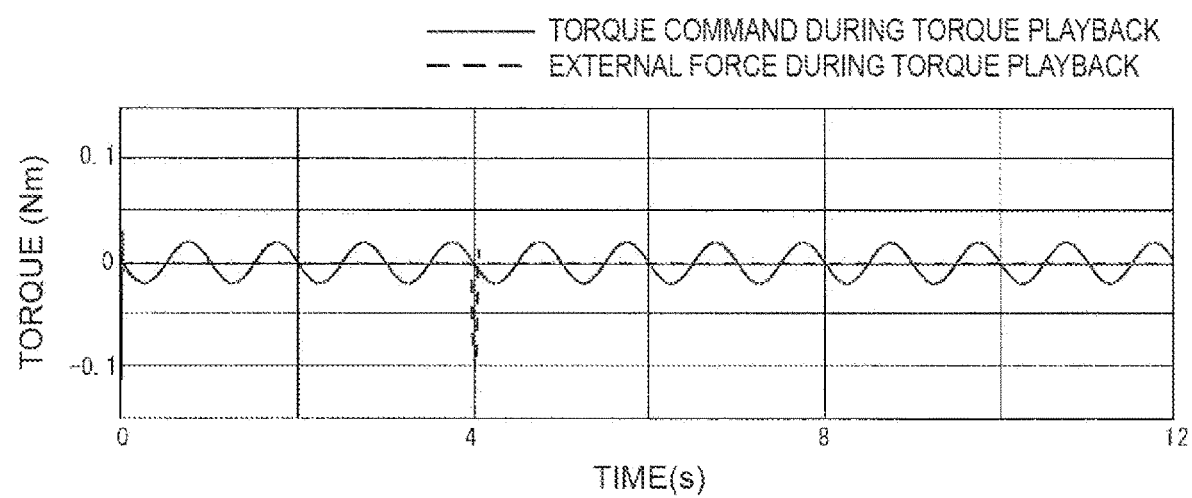
FIG. 11 is a graph showing still another example simulation result for verifying the effect.
Figure 12:
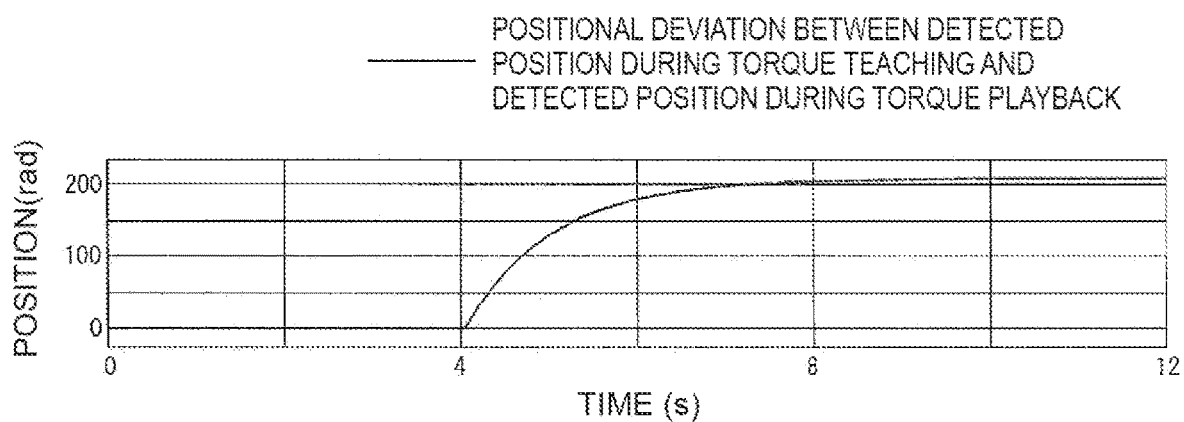
FIG. 12 is a graph showing still another example simulation result for verifying the effect.

FIG. 10 and FIG. 11 show examples of positions and torques at the time of torque playback. FIG. 12 shows an example of positional deviation between the detected position at the time of torque teaching (≈detected position at the time of position teaching) and the detected position at the time of torque playback. As shown in FIG. 10, at the time of torque playback for executing torque control, if an external force different from that at the time of torque teaching is received, the detected position does not follow the taught position command. Further, as shown in FIG. 12, when the external force is received, the positional deviation between the detected position at the time of torque teaching and the detected position at the time of torque playback exceeds, for example, 200 rad, which is a value 10 times or more as large as the magnitude 18.84 rad of the position command. As shown in FIG. 11, the torque command at the time of torque playback is the same as the torque command at the time of torque teaching. The maximum value of the magnitude of the external force indicating the torque applied to the contact target is 0.1 Nm in this example.

As shown in FIG. 8 and FIG. 11, the maximum values of the magnitude of the external force at the time of position playback and at the time of torque playback are 0.7 Nm and 0.1 Nm, respectively, and the external force applied to the contact object at the time of torque playback is smaller than that at the time of position playback. Therefore, also in the case of contact with a human, the same torque as that at the time of torque teaching is output to apply a force to the human, so that the external force applied to the human is smaller than that at the time of position playback. Accordingly, the force applied to the human can be reduced as compared with the position playback, and safety can be improved. In addition, as shown in FIG. 9 and FIG. 12, when the external force is not applied (0s to 4s), the detected position at the time of teaching and the detected position at the time of playback substantially coincide in both the position playback and the torque playback. Therefore, at the time of torque playback, if the applied external force is the same as that at the time of torque teaching, the same operation as that at the time of torque teaching is executed.

On the other hand, the positional deviation of the detected position when the external force is applied (after 4s) is 0.05 rad at the maximum at the time of position playback as shown in FIG. 9, whereas it is 200 rad or more at the time of torque playback as shown in FIG. 12, and a clear difference occurs. Therefore, whether or not the external force is applied during the torque playback may be determined from the positional deviation between the detected position during the torque teaching and the detected position during the torque playback.

As described above, in the torque playback, when the same external force as in the torque teaching is applied, the same operation as in the position playback is executed, and when an external force different from that in the torque teaching is applied, the operation is executed in accordance with the external force. Further, whether or not the external force is applied may be estimated from the positional deviation between the detected position at the time of torque teaching and the detected position at the time of torque playback. Therefore, by using the torque playback, a robot capable of collaborating with a human may be provided without using an external force measurement sensor and executing safe operation without causing harm to the human when in contact with the human.

The robot system 1 described above includes the robot 3 having a joint driven by the motor M and the robot controller 5 configured to control the motor M to operate the robot 3. The robot controller 5 includes the position control unit 25, the speed control unit 27, the current control unit 29, the torque command storage unit 33, and the current control unit 29. The position control unit 25, the speed control unit 27, and the current control unit 29 are configured to execute the position control of the motor M based on the position command. The torque command storage unit 33 is configured to store the torque command generated based on the position command in time series when the position control of the motor M is executed. The current control unit 29 is configured to execute torque control of the motor M based on the torque command stored in the torque command storage unit 33.

In the robot system 1, when teaching and playing back a desired position of the hand to the robot 3, the robot controller 5 controls the position of the motor M of each joint by the position control unit 25 or the like to operate the robot 3. At this time, the torque command calculated for the operation of each joint is stored in time series by the torque command storage unit 33 (torque teaching). The stored torque command is a torque command for moving the hand of the robot 3 to a desired position. Therefore, when the current control unit 29 executes torque control using the stored torque command as a command value, the hand of the robot 3 can be moved to the desired position (torque playback). The position control is a control for reaching a position commanded by any torque, while the torque control is a control for generating a torque commanded at any position. Therefore, by controlling the torque of the motor M so as to output a torque that does not harm the human, the robot 3 may be safely operated so as not to harm the human even when the robot 3 contacts the human. As described above, by executing the torque playback, the robot 3 may be safely operated when the robot 3 comes into contact with the human without providing (or reducing the number of) external force measurement sensors such as torque sensors and force sensors. Therefore, the robot system 1 capable of collaborative operation with human may be provided while preventing an increase in cost.

The robot 3 may include the encoder E that is configured to detect the position of the motor M. The robot controller 5 includes the detected position storage unit 35 and the contact determination unit 41. The detected position storage unit 35 is configured to store the detected position detected by the encoder E in time series when the position control of the motor M is executed by the position control unit 25 and the like. The contact determination unit 41 is configured to determine whether there is contact with the robot 3 during the torque control based on the positional deviation between the detected position stored in the detected position storage unit 35 and the detected position detected by the encoder E when torque control of the motor M is executed by the current control unit 29.

During the torque control by the current control unit 29 (torque playback), the robot 3 operates to follow the applied external force. Therefore, from the positional deviation between the detected position at the time of torque teaching and the detected position at the time of torque playback, whether or not an external force is applied to the robot 3 (whether or not contact is made with an external human or object) may be determined. Therefore, the presence or absence of contact with the robot 3 can be determined without providing an external force measurement sensor such as a torque sensor or a force sensor.

The contact determination unit 41 may be configured to compare the positional deviation with the first threshold, and determine that there is contact when the positional deviation is greater than the first threshold. The robot controller 5 has the stop unit 43 that is configured to stop the motor M when the contact determination unit 41 determines that there is the contact.

As a result, when the robot 3 comes into contact with a human or an object, the operation can be immediately stopped, so that the safety of the human collaborating with the robot 3 can be ensured, and damage to surrounding objects can be prevented.

2. Modification

Next, another example robot system will be described with reference to the drawings. In the robot system, disturbance is estimated using a disturbance observer at the time of torque teaching and torque playback.

2-1. Example Configuration of Robot Controller First, with reference to FIG. 13 and FIG. 14, an example functional configuration of a robot controller 5A will be described separately at the time of torque teaching and at the time of torque playback.

Figure 13:
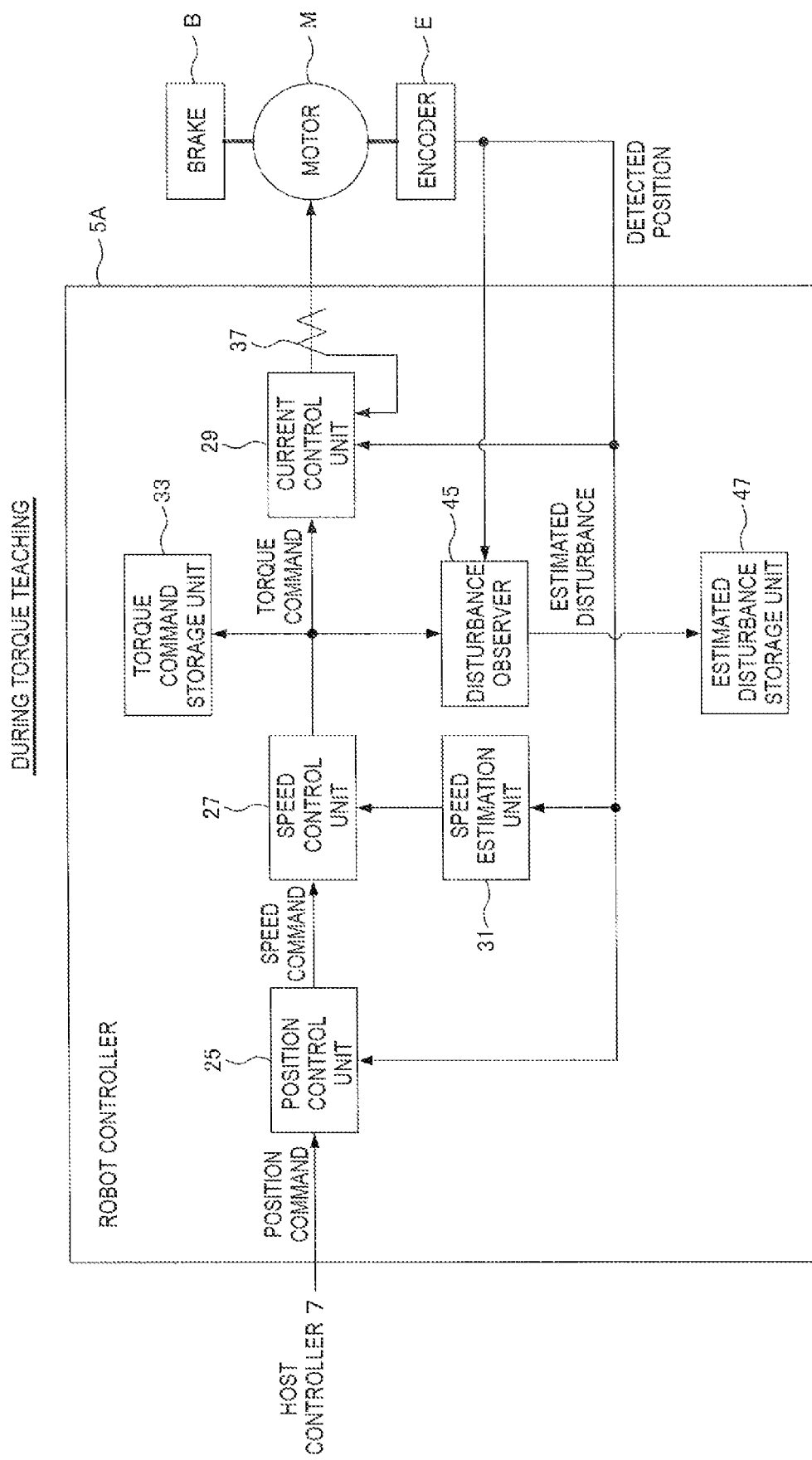
FIG. 13 is a block diagram illustrating an example functional configuration of the robot controller during torque teaching.

FIG. 13 illustrates an example functional configuration of the robot controller 5A during the torque teaching. As illustrated in FIG. 13, the robot controller 5A includes a disturbance observer 45 and an estimated disturbance storage unit 47 instead of the detected position storage unit 35. The disturbance observer 45 (an example of a disturbance estimation unit) is configured to estimate the disturbance based on the torque command generated by the speed control unit 27 and the detected position detected by the encoder E. When the position control of the motor M is executed by the position control unit 25, the speed control unit 27, and the current control unit 29, the estimated disturbance storage unit 47 is configured to store a value of an estimated disturbance (an example of a first estimated disturbance) estimated by the disturbance observer 45 in time series. That is, at the time of position playback, the torque command generated by the speed control unit 27 for an operation of each joint is stored in time series for each motor M by the torque command storage unit 33, and the estimated disturbance estimated by the disturbance observer 45 is stored in time series for each motor M by the estimated disturbance storage unit 47.

Figure 14:
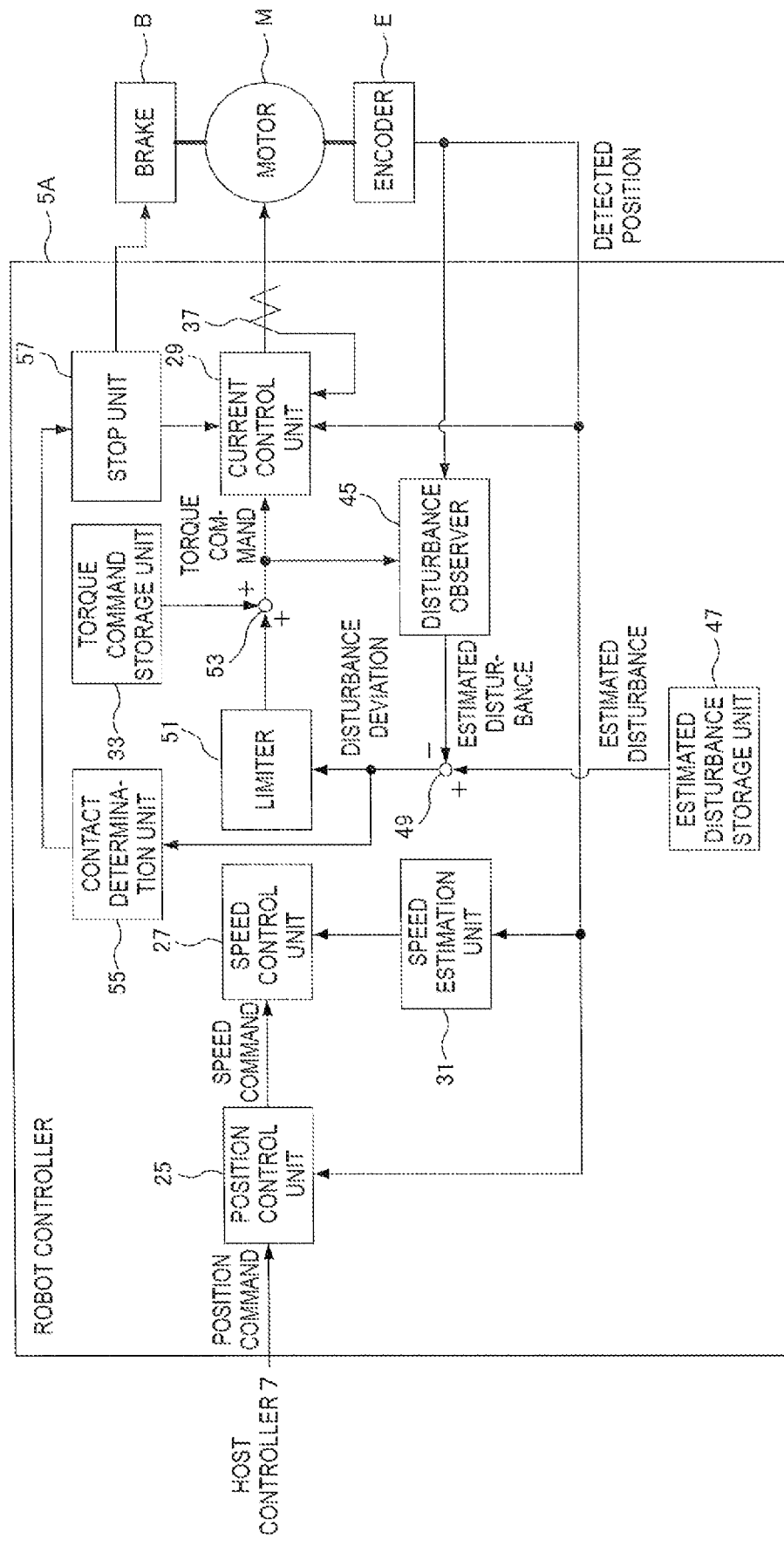
FIG. 14 is a block diagram illustrating an example functional configuration of the robot controller during torque playback.

FIG. 14 illustrates an example of the functional configuration of the robot controller 5A during the torque playback. As described above, there is a possibility that a greater disturbance than expected is applied to the robot 3 due to contact with human or the like during the torque playback. In order to determine whether or not this disturbance is applied, as illustrated in FIG. 14, the robot controller 5A has a subtractor 49, a limiter 51, an adder 53, a contact determination unit 55, and a stop unit 57 in addition to the configuration illustrated in FIG. 13.

The estimated disturbance stored in the estimated disturbance storage unit 47 and the estimated disturbance (an example of a second estimated disturbance) estimated by the disturbance observer 45 when executing torque control of the motor M by the current control unit 29 based on the torque command stored in the torque command storage unit 33 are input to the subtractor 49. The subtractor 49 is configured to output the disturbance deviation of the input estimated disturbances. The limiter 51 is configured to limit the disturbance deviation to a value equal to or less than a limit value set in advance in accordance with the standard. As a result, the magnitude of the disturbance to be corrected can be limited. The limiter 51 may not be provided. The adder 53 (an example of a torque command correction unit) is configured to correct the torque command by adding the disturbance deviation output from the subtractor 49 and limited by the limiter 51 to the torque command stored in the torque command storage unit 33. The current control unit 29 is configured to execute the torque control of the motor M based on the corrected torque command.

The contact determination unit 55 is configured to determine whether there is contact with the robot 3 during the torque control. The contact determination unit 55 may compare the disturbance deviation output by the subtractor 49 with a second threshold value (stopping threshold), and if the disturbance deviation is greater than the second threshold value, it is determined that the disturbance is added more than expected (the possibility of contact is high), and if the disturbance deviation is equal to or smaller than the second threshold value, it is determined that the disturbance is within expected (the possibility of contact is small).

When the contact determination unit 55 determines that there is contact, the stop unit 57 (an example of a second stop unit) is configured to stop supplying current to the motor M and activates the brake B to stop the motor M. The stop unit 57 may output an alarm instead of or in addition to stopping the motor M.

The functions of the robot controller 5A other than those described above are the same as those of the robot controller 5 illustrated in FIG. 2 and FIG. 3 described above, and thus the description thereof is omitted.

2-2. Control by Robot Controller

Figure 15:
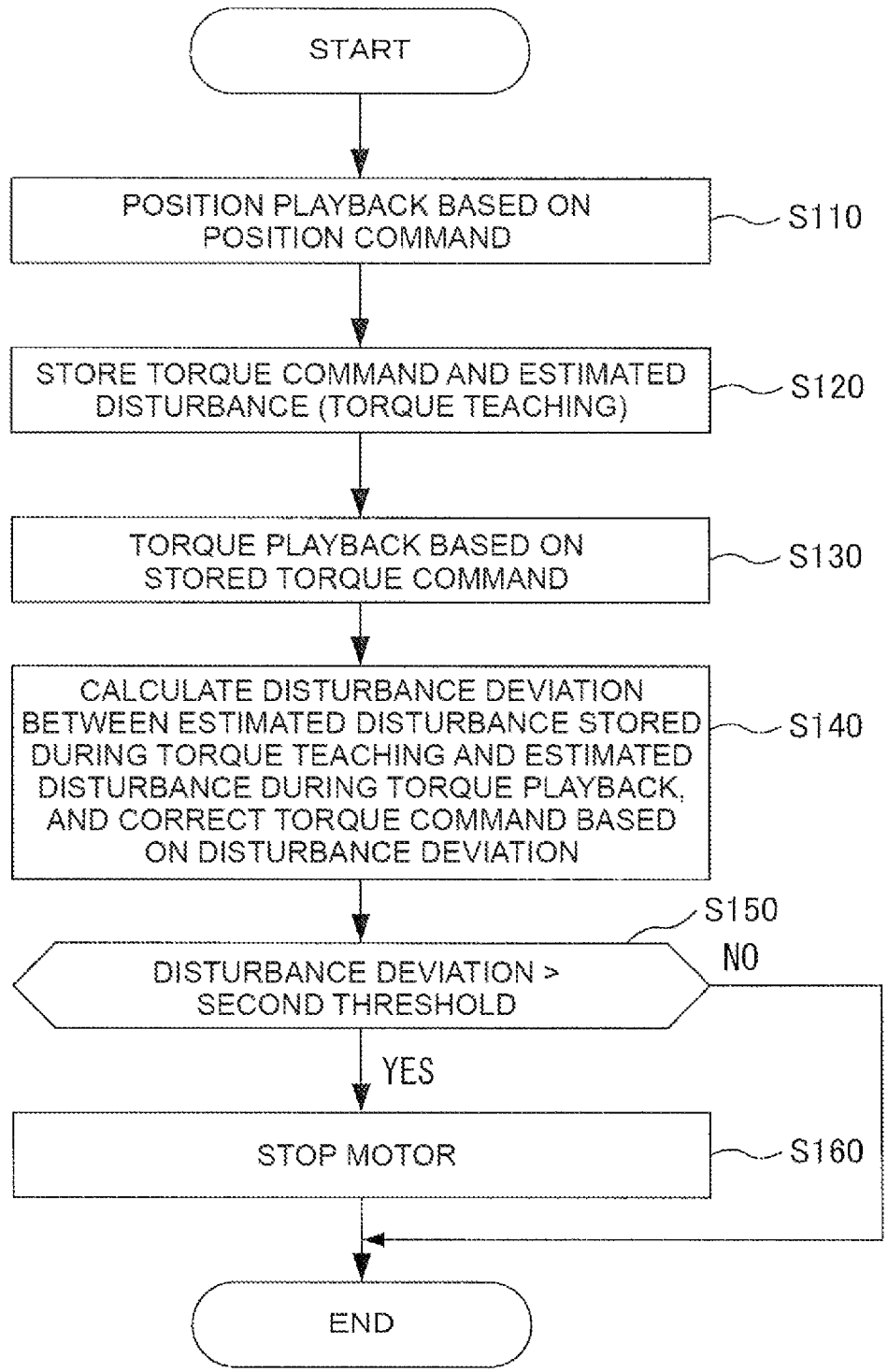
FIG. 15 is a flowchart illustrating an example control by the robot controller.

Next, an example control by the robot controller 5A will be described with reference to FIG. 15. It is assumed that, before executing this flowchart, teaching to the robot 3 is executed in advance using a teaching pendant or the like, and a position command corresponding to the teaching is stored in the host controller 7.

In a operation S110, the robot controller 5A executes position control for each motor M based on the position command from the host controller 7, and executes position playback for operating the robot 3.

In a operation S120, the robot controller 5A stores the torque command generated by the speed control unit 27 during the position playback in time series by the torque command storage unit 33 (torque teaching). In addition, the robot controller 5A stores the estimated disturbance estimated by the disturbance observer 45 during the position playback in time series by the estimated disturbance storage unit 47.

In a operation S130, the robot controller 5A executes the torque control using the torque command stored in the operation S120 as a command value for each motor M by the current control unit 29, and executes torque playback for operating the robot 3.

In a operation S140, the robot controller 5A calculates, by the subtractor 49, the disturbance deviation between the estimated disturbance at the time of torque teaching stored in the operation S120 and the estimated disturbance estimated by the disturbance observer 45 in the executing torque playback. The robot controller 5A corrects the torque command by adding the calculated disturbance deviation to the torque command stored in the operation S120 by the adder 53. The current control unit 29 executes torque control based on the corrected torque command.

In a operation S150, the robot controller 5A determines whether the disturbance deviation calculated in the operation S140 is greater than the second threshold by the contact determination unit 55. If the disturbance deviation is equal to or less than the second threshold value (the operation S150: NO), this flow is terminated. On the other hand, when the disturbance deviation is greater than the second threshold value (the operation S150: YES), the process proceeds to a operation S160.

In the operation S160, the robot controller 5A causes the stop unit 57 to stop supplying current to the motor M and activate the brake B to stop the motor M. Thereafter, this flow is terminated.

In the robot system 1 described above, the robot controller 5A includes the disturbance observer 45 configured to estimate a disturbance based on the torque command and the detected position of the encoder E, the estimated disturbance storage unit 47 configured to store the estimated disturbance estimated by the disturbance observer 45 in time series when the position control of the motor M is executed by the position control unit 25 and the like, and the adder 53 configured to correct the torque command stored in the torque command storage unit 33 based on the disturbance deviation between the estimated disturbance stored in the estimated disturbance storage unit 47 and the estimated disturbance estimated by the disturbance observer 45 during execution of the torque control of the motor M by the current control unit 29. The current control unit 29 executes the torque control of the motor M based on the torque command corrected by the adder 53.

According to the robot system 1, by calculating the difference between the estimated disturbance at the time of torque teaching and the estimated disturbance at the time of torque playback, the disturbance may be extracted while eliminating terms that are difficult to model, such as friction in the apparatus. As a result, the disturbance newly added to the system of the robot system 1 (the disturbance newly added at the time of the torque playback although not present at the time of the torque teaching) may be confirmed, and the torque control may be executed according to the disturbance. As a result, the deviation between the position reached during the torque playback and the position reached during the position playback may be reduced.

The robot controller 5A may include the stop unit 57 configured to compare the disturbance deviation with the second threshold and stop the motor M if the disturbance deviation is greater than the second threshold.

Thus, when a disturbance newly added at the time of torque playback is large (when the robot 3 comes into contact with a human or an object, or the like), the operation can be immediately stopped, so that the safety of the human collaborating with the robot 3 can be secured, and the damage of the surrounding object or the like can be prevented.

In addition to storing the torque command at the time of torque teaching and the estimated disturbance, the detected position may be stored, and whether or not the disturbance is added to the robot 3 may be determined from the positional deviation between the stored detected position and the detected position at the time of torque playback.

3. Other Modifications 3-1. Case where Torque Control is Executed for Some Axes

In the examples described above, the torque teaching and the torque playback are executed on each motor M of all the joints of the robot 3 which is the six-axis robot.

Figure 16:
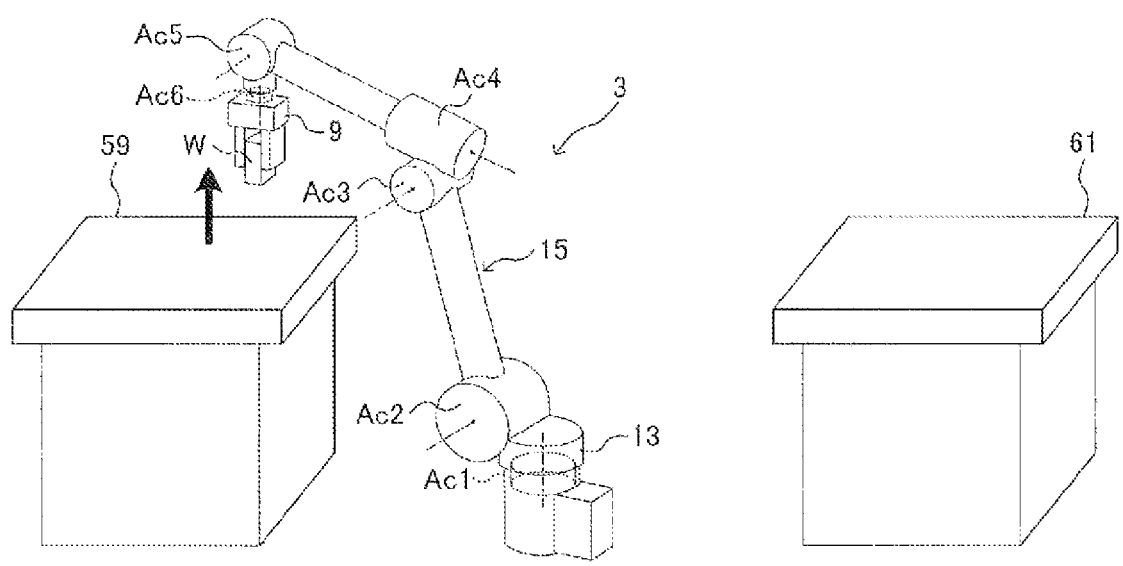
FIG. 16 is an explanatory diagram illustrating an example operation in a transfer operation of a workpiece executed by a robot in a modification in which torque control is executed on some axes.
Figure 17:
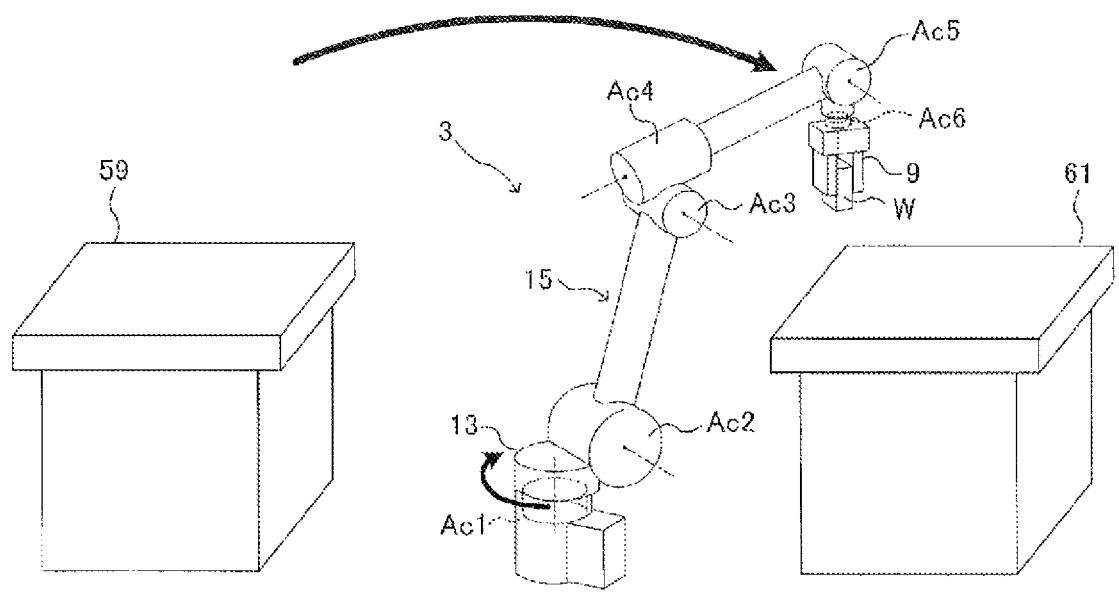
FIG. 17 is an explanatory diagram illustrating another example operation in the transfer operation of the workpiece executed by the robot in the modification in which the torque control is executed for some axes.
Figure 18:
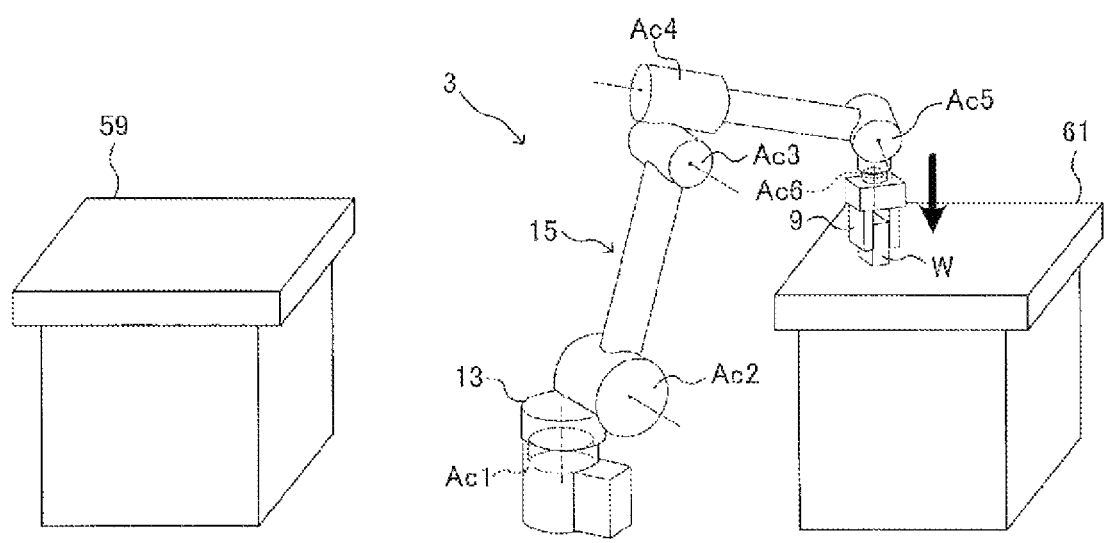
FIG. 18 is an explanatory diagram illustrating still another example operation in the transfer operation of the workpiece executed by the robot in the modification in which the torque control is executed for some axes.

FIG. 16 to FIG. 18 illustrate an example of the transfer operation of the workpiece W executed by the robot 3. First, as illustrated in FIG. 16, the robot 3 causes the hand 9 to grip the workpiece W placed on a table 59 as the transfer origin, raises the hand 9 by driving the actuators Ac2 to Ac6, for example, and lifts the workpiece W from the table 59. Next, as illustrated in FIG. 17, the robot 3 turns the turning portion 13 and the arm 15 by driving the actuator Ac1, for example, and moves the workpiece W from the vicinity of the table 59 as the transfer origin to the vicinity of a table 61 as the transfer destination. Thereafter, as illustrated in FIG. 18, the robot 3 lowers the hand 9 by driving the actuators Ac2 to Ac6, for example, and places the workpiece W on the table 61. The tables 59 and 61 may be, for example, a conveyor for conveying the workpiece W.

In such a transfer operation of the workpiece W, since the hand of the arm 15 moves largely in the turning operation illustrated in FIG. 17, contact with human is likely to occur. On the other hand, since the move of the hand of the arm 15 is small in the vertical operation illustrated in FIG. 16 and FIG. 18, contact with human is unlikely to occur. Therefore, torque control (torque teaching and torque playback) may be executed for the motor M of the actuator Ac1, and position control may be executed for the motor M of the other actuators Ac2 to Ac6.

When the robot 3 executes the turning operation illustrated in FIG. 17 by the position playback, the torque command storage unit 33 stores the torque command for the motor M of the actuator Ac1 in time series (torque teaching). When the robot 3 executes the turning operation illustrated in FIG. 17 by the torque playback, the current control unit 29 executes the torque control of the motor M of the actuator Ac1 based on the torque command stored in the torque command storage unit 33. At this time, the position control based on the position command is executed by the position control unit 25 or the like for the motor M of the other actuators Ac2 to Ac6. When the robot 3 executes the vertical operation illustrated in FIG. 16 or FIG. 18, the position control is executed for the motor M of all actuators Ac1 to Ac6.

Therefore, safety may be secured by executing torque control for the motor M of a joint corresponding to an operation that is likely to cause contact with a human or an object, such as an operation that turns the hand 9 to move the workpiece W large, and positional accuracy of work by the robot 3 may be improved by executing position control for the motor M of a joint corresponding to another operation that is unlikely to cause contact with a human or an object, such as an operation that brings the hand 9 close to the workpiece W. Therefore, both safety and work accuracy may be achieved.

Note that the above is an example, torque control may be executed on the motor M (may be a motor or a plurality of motors) of other actuator(s) instead of or in addition to the actuator 1. Further, the present disclosure may be applied to a case where the robot 3 executes a task other than the transfer operation of the workpiece W.

3-2. Case of Switching from Torque Control to Position Control As described above, the robot 3 may be moved to a position substantially equivalent to the position control by executing the torque control using the torque command stored when the position control is executed as a command value when a disturbance different from that at the time of the position control is not added to the robot 3. However, since the position control is not executed, a positional deviation may occur due to some disturbance. Therefore, a third threshold (switching threshold) may be provided, and when the positional deviation caused by the torque control is greater than the third threshold, the positional deviation is regarded as being out of the allowable range, and the torque control may be switched to the position control.

Figure 19:
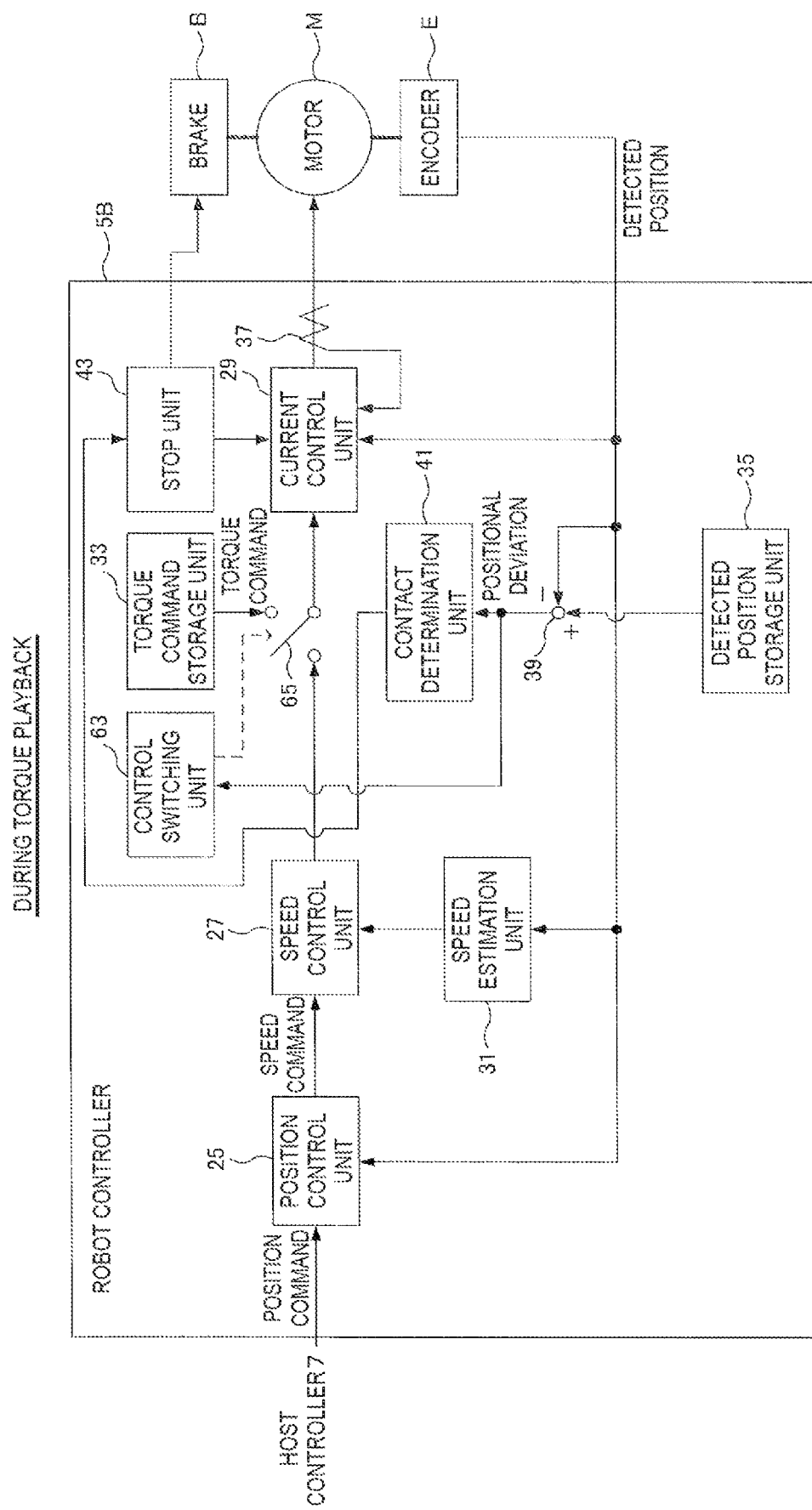
FIG. 19 is a block diagram illustrating an example functional configuration of the robot controller at the time of torque playback in a modification in which switching from torque control to position control is executed.

FIG. 19 illustrates an example of the functional configuration of a robot controller 5B of this modification. The functional configuration at the time of torque teaching is the same as that in the example robot system described above, and thus the description thereof is omitted.

As illustrated in FIG. 19, the robot controller 5B includes a control switching unit 63 and a switch unit 65 in addition to the configuration of the robot controller 5 illustrated in FIG. 3. The control switching unit 63 is configured to connect the torque command storage unit 33 and the current control unit 29 via the switch unit 65 during the torque playback. Accordingly, the current control unit 29 executes the torque control based on the torque command stored in the torque command storage unit 33. The control switching unit 63 is configured to compare the positional deviation output from the subtractor 39 with the third threshold at a predetermined timing during the torque playback. When the positional deviation is equal to or less than the third threshold, the control switching unit 63 is configured to consider that the positional deviation is within the allowable range, and maintain the torque control. On the other hand, when the positional deviation is greater than the third threshold, the control switching unit 63 is configured to consider that the positional deviation is out of the allowable range, and switch the switch unit 65 from the torque command storage unit 33 side to the speed control unit 27 side. As a result, the torque control is switched to the position control by the position control unit 25 or the like.

The "predetermined timing" may be a timing having a constant cycle, or may be, for example, a timing at which the torque control is ended. For example, when the robot 3 executes the transfer operation of the workpiece W illustrated in FIG. 16 to FIG. 18 described above, the timing may be the timing at which the turning operation illustrated in FIG. 17 ends. That is, in the case of such a transfer operation of the workpiece W, there is a possibility that the hand of the arm 15 deviates due to an influence of some disturbance in the turning operation illustrated in FIG. 17. Therefore, at the end timing of the turning operation, the positional deviation is compared with the third threshold by the control switching unit 63, and if the positional deviation is equal to or less than the third threshold, it is regarded that the positional deviation is within the allowable range, and the operation proceeds to the lowering operation illustrated in FIG. 18. On the other hand, if the positional deviation is greater than the third threshold, it is considered that the positional deviation is out of the allowable range, and the torque control is switched to the position control before shifting to the lowering operation illustrated in FIG. 18. Thus, the positional deviation of the hand of the arm 15 can be corrected based on the position command. After the positional deviation is eliminated, the process proceeds to the lowering operation illustrated in FIG. 18.

Figure 20:
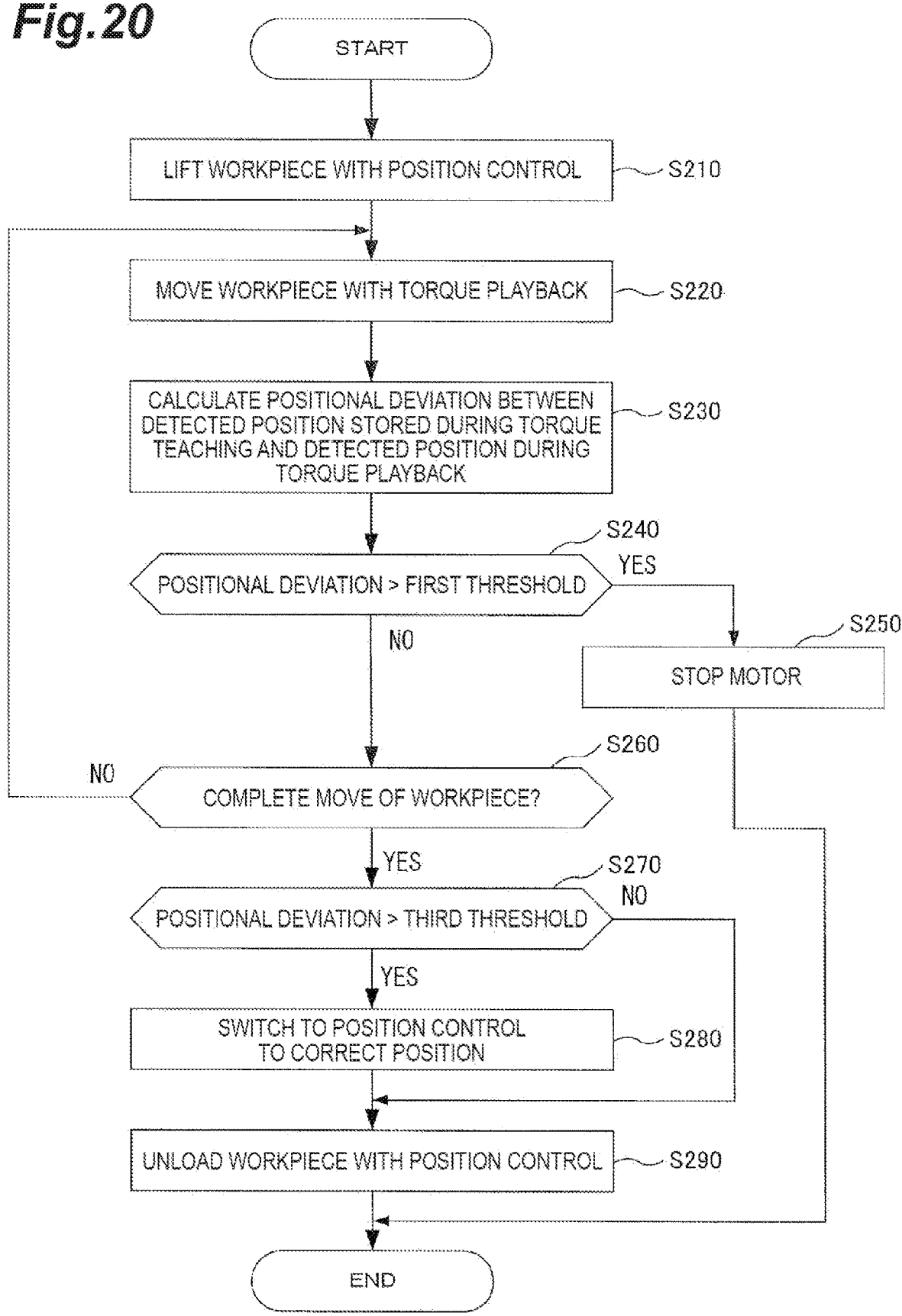
FIG. 20 is a flowchart illustrating an example control by the robot controller in the modification of switching from torque control to position control.

Next, an example control by the robot controller 5B will be described with reference to FIG. 20. Here, a case where the robot 3 executes the transfer operation of the workpiece W illustrated in FIG. 16 to FIG. 18 will be described. In addition, it is assumed that before executing this flowchart, teaching of a transfer operation of the workpiece W to the robot 3 is executed in advance using a teaching pendant or the like, and a torque command for the motor M of the actuator Ac1 is stored in time series by the torque command storage unit 33 when the robot 3 executes the turning operation illustrated in FIG. 17 (torque teaching).

In a operation S210, the robot controller 5B causes the hand 9 to grip the workpiece W placed on the table 59 of the transfer origin, raises the hand 9 by executing position control on the motor M of, for example, the actuators Ac2 to Ac6, and lifts the workpiece W from the table 59.

In a operation S220, the robot controller 5B moves the workpiece W from the vicinity of the table 59 of the transfer origin to the vicinity of the table 61 of the transfer destination by executing torque control on the motor M of the actuator Ac1 based on the torque command stored in the torque command storage unit 33 (torque playback). At this time, the position control based on the position command is executed by the position control unit 25 and the like for the motor M of the other actuators Ac2 to Ac6.

In a operation S230, the robot controller 5B calculates, by the subtractor 39, the positional deviation between the detected position at the time of stored torque teaching and the detected position detected by the encoder E in the executing torque playback.

In a operation S240, the robot controller 5B determines whether the positional deviation calculated in the operation S230 is greater than the first threshold by the contact determination unit 41. If the positional deviation is greater than the first threshold (the operation S240: YES), the process moves to a operation S250.

In the operation S250, the robot controller 5B causes the stop unit 43 to stop supplying current to the motor M and activate the brake B to stop the motor M. Thereafter, this flow is terminated.

On the other hand, in the operation S240, when the positional deviation is equal to or less than the first threshold (the operation S240: NO), the process proceeds to an operation S260.

In the operation S260, the robot controller 5B determines whether the moving operation of the workpiece W has been completed. This determination is executed by, for example, determining whether all the torque commands stored in the torque command storage unit 33 have been dispensed. When the moving operation of the workpiece W is not completed (the operation S260: NO), the process returns to the previous the operation S220, and the same procedure is repeated. On the other hand, when the moving operation of the workpiece W is completed (the operation S260: YES), the process proceeds to a operation S270.

In the operation S270, the robot controller 5B determines whether the positional deviation calculated in the operation S230 is greater than the third threshold by the control switching unit 63. If the positional deviation is equal to or less than the third threshold (the operation S270: NO), the process moves to an operation S290 described later. On the other hand, if the positional deviation is greater than the third threshold (the operation S270: YES), the process moves to an operation S280.

In the operation S280, the robot controller 5B switches the switch unit 65 from the torque command storage unit 33 side to the speed control unit 27 side by the control switching unit 63, and switches the torque control to the position control. Thus, the positional deviation of the hand of the arm 15 is corrected based on the position command.

In the operation S290, the robot controller 5B lowers the hand 9 by executing position control on the motor M of the actuators Ac2 to Ac6, for example, and places the workpiece W on the table 61. Thereafter, this flow is terminated.

According to the modification described above, the robot controller 5B includes the control switching unit 63 that compares the positional deviation with the third threshold at a predetermined timing during the torque control by the current control unit 29 and switches to the position control by the position control unit 25 and the like when the positional deviation is greater than the third threshold.

As a result, even when the positional deviation occurs due to the torque playback, the positional deviation can be corrected by switching from the torque control to the position control, so that the positional accuracy after the execution of the torque playback can be improved.

3-3. Case where Mode Switching is Available

For example, as operating modes of the robot 3, a normal mode for executing position playback and a human collaboration mode for executing torque playback may be provided, and these operating modes may be switched by a user.

Figure 21:
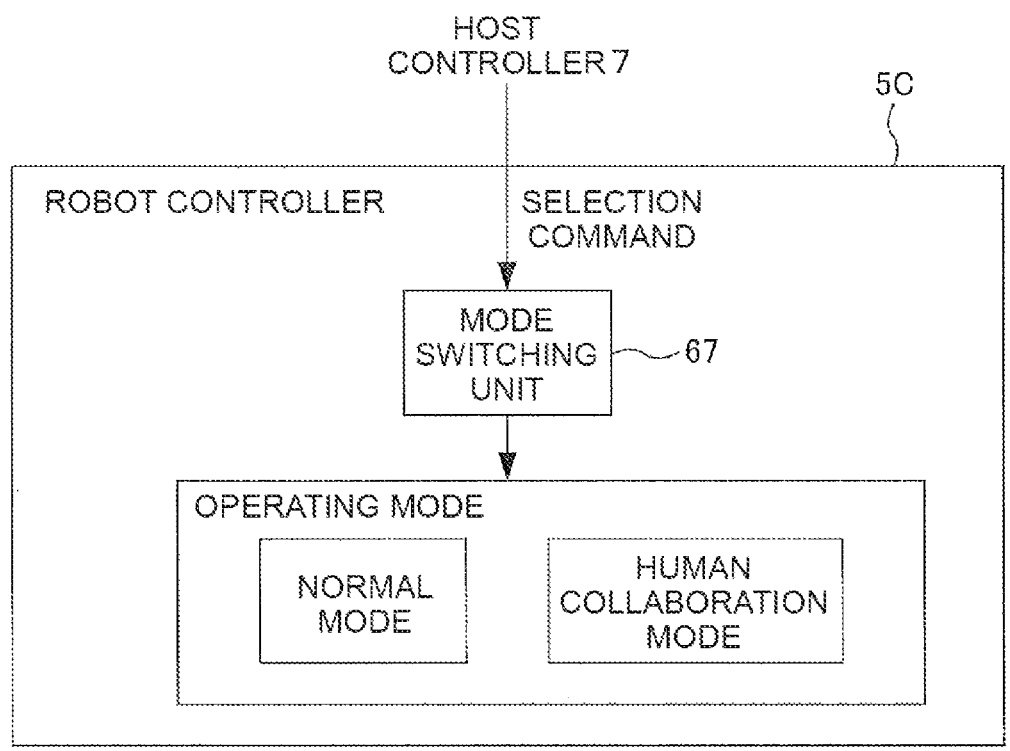
FIG. 21 is a block diagram illustrating an example functional configuration of a portion related to mode switching of the robot controller in a modification in which mode switching is enabled.

FIG. 21 illustrates an example of a functional configuration of a portion related to mode switching of a robot controller 5C of the present modification. As illustrated in FIG. 21, the robot controller 5C has "normal mode" and "human collaboration mode" as the operating modes of the robot 3. The robot controller 5C includes a mode switching unit 67 that switches between "normal mode" and "human collaboration mode" based on a selection operation by the user. The normal mode (an example of the first mode) is a mode in which the position control is executed by the position control unit 25 and the like based on the position command for all the motors M including the motor M of which the torque command is stored in the torque command storage unit 33. That is, the normal mode is a mode in which position control (position playback) is executed for the motors M of all the joints of the robot 3. On the other hand, the human collaboration mode (an example of the second mode) is a mode in which torque control (torque playback) is executed by the current control unit 29 based on the torque command stored in the torque command storage unit 33 for the motors M of at least one of joints of the robot 3. The mode switching unit 67 switches the operating mode to either the "normal mode" or the "human collaboration mode" based on a user selection command transmitted from the host controller 7, a terminal, or the like. The other functions of the robot controller 5C are the same as those of the above-described the robot controller 5 and the like, and thus the description thereof will be omitted.

According to this modification, the user can select the control of the robot 3 according to the operating environment, such as operating in the human collaboration mode when collaborating the robot 3 with human, and operating in the normal mode when not collaborating with human. Therefore, the versatility and flexibility of the robot system 1 can be enhanced.

3-4. Case where an External Force Measurement Sensor is Provided

An external force measurement sensor may be installed at a position as necessary.

Figure 22:
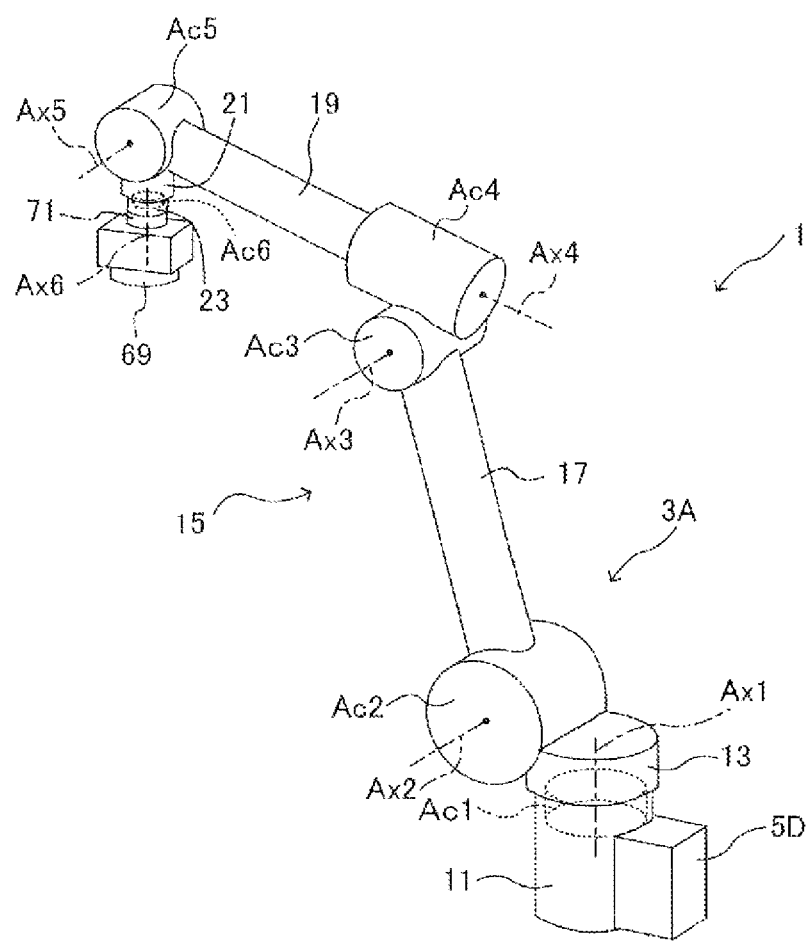
FIG. 22 is a perspective view illustrating an example configuration of a robot system in a modification in which an external force measurement sensor is provided.

FIG. 22 illustrates an example configuration of a robot 3A of this modification. As illustrated in FIG. 22, the robot 3A includes an end effector 69 for executing a predetermined task and an external force measurement sensor 71 configured to measure an external force acting on the end effector 69. The end effector 69 is not particularly limited, and is a tool for executing operations such as painting, welding, bolting, and machining (cutting, polishing, etc.). The external force measurement sensor 71 is, for example, a six-axis force sensor.

Figure 23:
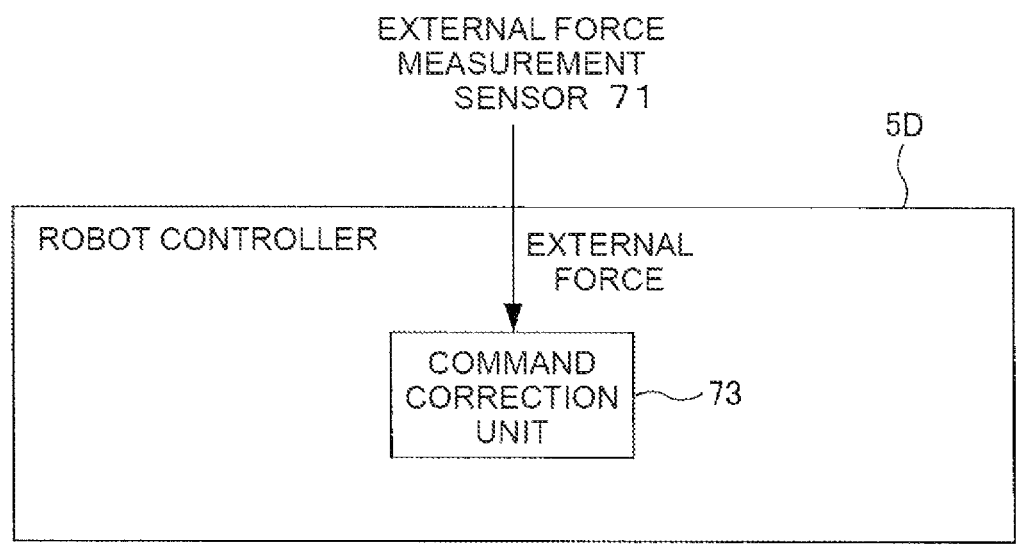
FIG. 23 is a block diagram illustrating an example functional configuration of a portion related to mode switching of a robot controller in the modification in which the external force measurement sensor is provided.

FIG. 23 illustrates an example functional configuration of a portion related to command correction of a robot controller 5D of this modification. As illustrated in FIG. 23, the robot controller 5D includes a command correction unit 73 configured to correct the torque command generated by the speed control unit 27 based on the external force measured by the external force measurement sensor 71. A command other than the torque command, such as a position command input from the host controller 7, may be corrected. The other functions of the robot controller 5D are the same as those of the above-described the robot controller 5 and the like, and thus the description thereof will be omitted.

According to the present modification, by correcting the torque command based on the detection result of the external force measurement sensor 71, the robot system 1 capable of collaborative operation with human while securing the accuracy of work by the end effector 69 may be provided. For example, the present disclosure is suitable for executing a work such as cutting or polishing by pressing the end effector 69 against a workpiece.

3-5. Others

Although the case where the torque teaching and the torque playback are applied to the robot system including the general-purpose robot of, for example, the vertical articulated type, the horizontal articulated type, the parallel link type, or the like and the robot controller has been described above, the application target is not limited thereto. For example, the present disclosure may be applied to a work machine system including a dedicated work machine designed for a work and provided with an actuator movable in at least one of the X, Y, Z, and θ directions and a controller for controlling the dedicated work machine. Further, the present disclosure may be applied to a servo system having a rotary motor, a linear motor, and a controller for controlling the motor.

4. Example Hardware Configuration of Robot Controller

Next, the above-described the robot controller 5 (including 5A to 5C, the same applies hereinafter) is described with reference to FIG. 23. In FIG. 23, a configuration related to a function of supplying driving power to the motor M of the robot controller 5 may be omitted. The host controller 7 may have the same configuration.

As illustrated in FIG. 23, the robot controller 5 includes, for example, a central processing unit (CPU) 901, a read only memory (ROM) 903, a random access memory (RANI) 905, a dedicated integrated circuit 907 configured for a specific application such as an ASIC or an FPGA, an input device 913, an output device 915, a storage device 917, a driver 919, a connection port 921, and a communication device 923. These components are connected to each other via a bus 909 or an input/output interface 911 so that signals can be transmitted therebetween.

The program can be stored in, for example, the ROM 903, the RANI 905, or the storage device 917 such as a hard disk.

Further, the program may be temporarily or permanently stored in a removable storage medium 925 such as a magnetic disk such as a flexible disk, various optical disks such as a compact disk (CD), a magneto-optic (MO) disk, and a digital versatile disk (DVD), or a semiconductor memory. Such storage medium 925 can be provided as so-called package software. In this case, the program stored in the storage medium 925 may be read by the driver 919 and stored in the storage device 917 via the input/output interface 911, the bus 909, or the like.

The program may be stored in a download site, another computer, another storage device, or the like (not shown), for example. In this case, the program is transferred via a network NW such as a local area network (LAN) or the Internet, and the communication device 923 receives the program. The program received by the communication device 923 may be stored in the storage device 917 via the input/output interface 911, the bus 909, or the like.

The program may be stored in an external connection device 927, for example. In this case, the program may be transferred via the connection port 921 and stored in the storage device 917 via the input/output interface 911, the bus 909, or the like.

Then, the CPU 901 executes various processes according to the program stored in the storage device 917, whereby the processes by the position control unit 25, the speed control unit 27, the current control unit 29, the speed estimation unit 31, the torque command storage unit 33, the detected position storage unit 35, and the like are provided. In this case, the CPU 901 may executed the program by directly reading the program from the storage device 917 or may executed the program after the program is once loaded into the RANI 905. Further, when the CPU 901 receives a program via the communication device 923, the driver 919, or the connection port 921, for example, the CPU 901 may directly execute the received program without recording the received program in the storage device 917.

The CPU 901 may execute various processes based on signals and information input from the input device 913 such as a mouse, a keyboard, and a microphone (not shown).

Then, the CPU 901 may output the result of executing the above processing from the output device 915 such as a display device or a voice output device, and the CPU 901 may transmit the processing result via the communication device 923 or the connection port 921, or may record the processing result in the storage device 917 or the storage medium 925.

In the above description, the terms "perpendicular", "parallel", "plane", and the like do not have a strict meaning. That is, the terms "perpendicular", "parallel", and "plane" allow design and manufacturing tolerances and errors, and the terms mean "substantially perpendicular", "substantially parallel", and "substantially plane", respectively.

In addition, in the above description, when there are descriptions such as "the same", "equal", and "different" in terms of dimensions and sizes in appearance, the descriptions do not have a strict meaning. That is, the terms "the same", "equal", and "different" allow design and manufacturing tolerances and errors, and the terms mean "substantially the same", "substantially equal", and "substantially different", respectively.

However, when there is a description of a value serving as a predetermined determination reference or a value serving as a delimiter, such as a threshold value (see the flowcharts of FIG. 4, FIG. 15, and FIG. 20) or a reference value, "the same", "equal", "different", and the like with respect to these values are different from the above description and have strict meanings.

As described above, the robot system 1 may comprise: a robot 3,3A comprising a joint driven by a motor M; and circuitry 5,5A,5B,5C,5D configured to: execute position control of the motor M based on position commands; store a torque commands generated based on the position commands during execution of the position control of the motor M; and execute torque control of the motor M based on the stored torque commands.

Executing the position control may include generating the torque commands to cause an angular position of the motor M to follow the position commands. Executing the torque control may include causing the motor M to generate torque in accordance with the torque commands.

The circuitry 5,5A,5B,5C,5D may further be configured to: store first angular positions of the motor M detected during execution of the position control; calculate a positional deviation between a first angular position of the stored first angular positions and a second angular position of the motor M detected during execution of the torque control; and determine whether there is a contact with the robot 3,3A during execution of the torque control based on the positional deviation during execution of the torque control.

The robot 3,3A may further comprise an encoder E configured to detect the first angular positions and the second angular position.

The circuitry 5,5A,5B,5C,5D may further be configured to stop the motor M in response to determining the contact with the robot 3,3A.

The circuitry 5,5A,5B,5C,5D may further be configured to: store first angular positions of the motor M detected during execution of the position control; calculate a positional deviation between a first angular position of the stored first angular positions and a second angular position of the motor M detected during execution of the torque control of the motor M; and stop the motor M in response to determining that the positional deviation is greater than a predetermined stopping threshold.

The circuitry 5,5A,5B,5C,5D may further be configured to: store first disturbances that have acted on the motor M and that were estimated during execution of the position control based on the torque commands and the angular position of the motor M; estimate a second disturbance that has acted on the motor M during execution of the torque control based on the torque commands and the angular position of the motor M; correct a torque command of the stored torque commands based on a disturbance deviation between a first disturbance of the stored first disturbances and the estimated second disturbance; and execute the torque control based on the corrected torque command.

The circuitry 5,5A,5B,5C,5D may further be configured to: determine whether there is a contact with the robot 3,3A during execution of the torque control based on the disturbance deviation.

The circuitry 5,5A,5B,5C,5D may further be configured to stop the motor M in response to determining the contact with the robot 3,3A.

The circuitry 5,5A,5B,5C,5D may further be configured to stop the motor M in response to determining that the disturbance deviation is greater than a predetermined stopping threshold.

The robot system 1 according to claim 1, wherein the circuitry 5,5A,5B,5C,5D may further be configured to: store first angular positions of the motor M detected during execution of the position control; calculate a positional deviation between a first angular position of the stored first angular positions and a second angular position of the motor M detected at a predetermined timing during the torque control; and switch the torque control to the position control in response to determining that the positional deviation is greater than a predetermined switching threshold.

The circuitry 5,5A,5B,5C,5D may further be configured to: store first angular positions of the motor M detected during execution of the position control of the motor M; calculate a positional deviation between a first angular position of the stored first angular positions and a second angular position of the motor M detected during the torque control; stop the motor M in response to determining that the positional deviation is greater than a predetermined stopping threshold; and switch the torque control to the position control in response to determining that the positional deviation calculated at a predetermined timing during the torque control is greater than a predetermined switching threshold.

The robot 3,3A comprises a plurality of joints driven by a plurality of motors M, and the circuitry 5,5A,5B,5C,5D may further be configured to: execute the position control of each of the plurality of motors M; store, for one or more motors M of the plurality of motors M, the torque commands generated based on the position commands; execute the torque control of the one or more motors M based on the stored torque commands; and execute the position control of each of the plurality of motors M other than the one or more motors M during the torque control of the one or more motors M.

The circuitry 5,5A,5B,5C,5D may further be configured to: switch between a first mode and a second mode, based on a user selection; execute, in the first mode, a second position control based on the position commands instead of the torque control; and execute, in the second mode, the torque control based on the stored torque command.

The robot 3,3A may comprise: an end effector 69 for executing a predetermined task; and an external force measurement sensor 71 configured to measure an external force acting on the end effector 69, and the circuitry 5,5A,5B,5C, 5D may further be configured to: correct a torque command of the stored torque commands based on the external force measured by the external force measurement sensor 71; and execute the torque control based on the corrected torque command.

The robot 3,3A may comprise: an end effector 69 for executing a predetermined task; and an external force measurement sensor 71 configured to measure an external force acting on the end effector 69, and the circuitry 5,5A,5B,5C, 5D may further be configured to: correct a position command based on the external force measured by the external force measurement sensor 71; and store the torque commands generated based on the position commands including the corrected position command.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A robot system comprising:
a robot comprising a joint driven by a motor; and
circuitry configured to:
execute position control of the motor during a first mode of operation based on sequential position commands that specify an angular position of the motor for each of the position commands, so that the angular position of the motor sequentially follows the position commands;
store torque commands generated during execution of the first mode of operation, wherein the stored torque commands identify a torque generated by the motor corresponding to the angular position for each of the position commands; and
execute, after the first mode of operation, torque control of the motor during a second mode of operation based on the stored torque commands, so that the torque generated by the motor sequentially follows the stored torque commands.

2. The robot system according to claim 1, wherein the circuitry is further configured to:
store first angular positions of the motor detected during execution of the first mode of operation;
calculate a positional deviation between a first angular position of the stored first angular positions and a second angular position of the motor detected during execution of the second mode of operation; and
determine whether there is a contact with the robot during execution of the second mode of operation based on the positional deviation during execution of the second mode of operation.

3. The robot system according to claim 2, wherein the robot further comprises an encoder configured to detect the first angular positions and the second angular position.

4. The robot system according to claim 2, wherein the circuitry is further configured to stop the motor in response to determining the contact with the robot.

5. The robot system according to claim 1, wherein the circuitry is further configured to:
store first angular positions of the motor detected during execution of the first mode of operation;
calculate a positional deviation between a first angular position of the stored first angular positions and a second angular position of the motor detected during execution of the second mode of operation; and
stop the motor in response to determining that the positional deviation is greater than a predetermined stopping threshold.

6. The robot system according to claim 1, wherein the circuitry is further configured to:
store first disturbances that have acted on the motor and that were estimated during execution of the first mode of operation based on the torque commands and angular positions of the motor;
estimate a second disturbance that has acted on the motor during execution of the second mode of operation based on the torque commands and the angular positions of the motor;
correct a torque command of the stored torque commands based on a disturbance deviation between a first disturbance of the stored first disturbances and the estimated second disturbance; and
execute the torque control based on the corrected torque command.

7. The robot system according to claim 6, wherein the circuitry is further configured to determine whether there is a contact with the robot during execution of the second mode of operation based on the disturbance deviation.

8. The robot system according to claim 7, wherein the circuitry is further configured to stop the motor in response to determining the contact with the robot.

9. The robot system according to claim 6, wherein the circuitry is further configured to stop the motor in response to determining that the disturbance deviation is greater than a predetermined stopping threshold.

10. The robot system according to claim 1, wherein the circuitry is further configured to:
store first angular positions of the motor detected during execution of the first mode of operation;
calculate a positional deviation between a first angular position of the stored first angular positions and a second angular position of the motor detected at a predetermined timing during execution of the second mode of operation; and
switch the torque control to the position control in response to determining that the positional deviation is greater than a predetermined switching threshold.

11. The robot system according to claim 1, wherein the circuitry is further configured to:
store first angular positions of the motor detected during execution of the first mode of operation;
calculate a positional deviation between a first angular position of the stored first angular positions and a second angular position of the motor detected during execution of the second mode of operation;
stop the motor in response to determining that the positional deviation is greater than a predetermined stopping threshold; and switch the torque control to the position control in response to determining that the positional deviation calculated at a predetermined timing during execution of the second mode of operation is greater than a predetermined switching threshold.

12. The robot system according to claim 1, wherein the robot comprises a plurality of joints driven by a plurality of motors, and
wherein the circuitry is further configured to:
execute the position control of each of the plurality of motors during execution of the first mode of operation;
store, for one or more motors of the plurality of motors, the torque commands generated during execution of the first mode of operation;
execute the torque control of the one or more motors based on the stored torque commands during execution of the second mode of operation; and
execute the position control of each of the plurality of motors other than the one or more motors during execution of the second mode of operation.

13. The robot system according to claim 1, wherein the circuitry is further configured to:
switch between a first control mode and a second control mode, based on a user selection;
execute, in the first control mode, a second position control based on the position commands instead of the torque control during execution of the second mode of operation; and
execute, in the second control mode, the torque control based on the stored torque commands during execution of the second mode of operation.

14. The robot system according to claim 1, wherein the robot comprises:
an end effector for executing a predetermined task; and
an external force measurement sensor configured to measure an external force acting on the end effector, and
wherein the circuitry is further configured to:
correct a torque command of the stored torque commands based on the external force measured by the external force measurement sensor; and
execute the torque control based on the corrected torque command.

15. The robot system according to claim 1, wherein the robot comprises:
an end effector for executing a predetermined task; and
an external force measurement sensor configured to measure an external force acting on the end effector, and
wherein the circuitry is further configured to:
correct a position command based on the external force measured by the external force measurement sensor; and
store the torque commands generated based on the position commands including the corrected position command.

16. A method for controlling a robot having a joint driven by a motor, the method comprising:
executing position control of the motor during a first mode of operation based on sequential position commands that specify an angular position of the motor for each of the position commands, so that the angular position of the motor sequentially follows the position commands;

storing torque commands generated during execution of the first mode of operation, wherein the stored torque commands identify a torque generated by the motor corresponding to the angular position for each of the position commands; and
executing, after the first mode of operation, torque control of the motor during a second mode of operation based on the stored torque commands, so that the torque generated by the motor sequentially follows the stored torque commands.

17. The method according to claim 16, further comprising:
storing first angular positions of the motor detected during execution of the first mode of operation;
calculating a positional deviation between a first angular position of the stored first angular positions and a second angular position of the motor detected during execution of the second mode of operation; and
determining whether there is a contact with the robot during execution of the second mode of operation based on the positional deviation during execution of the second mode of operation.

18. The method according to claim 16, further comprising:
storing a first angular position of the motor detected during execution of the first mode of operation;
calculating a positional deviation between the stored first angular position and a second angular position of the motor detected during execution of the second mode of operation; and
switching the torque control to the position control in response to determining that the positional deviation is greater than a predetermined switching threshold.

19. A servo system comprising:
a motor; and
circuitry configured to:
execute position control of the motor during a first mode of operation based on sequential position commands that specify an angular position of the motor for each of the position commands, so that the angular position of the motor sequentially follows the position commands;
store torque commands generated during execution of the first mode of operation, wherein the stored torque commands identify a torque generated by the motor corresponding to the angular position for each of the position commands; and
execute, after the first mode of operation, torque control of the motor during a second mode of operation based on the stored torque commands, so that the torque generated by the motor sequentially follows the stored torque commands.

20. The servo system according to claim 19, wherein the circuitry is further configured to:
store first angular positions of the motor detected during execution of the first mode of operation;
calculate a positional deviation between a first angular position of the stored first angular positions and a second angular position of the motor detected during execution of the second mode of operation; and
switch the torque control to the position control in response to determining that the positional deviation is greater than a predetermined switching threshold.

* * * * *